United States Patent [19]

Yamagiwa et al.

[11] Patent Number: 5,375,677
[45] Date of Patent: Dec. 27, 1994

[54] BODY FRAME FOR A MOTORCYCLE

[75] Inventors: Toshio Yamagiwa, Niiza; Shigehiro Maruoka, Oomiya; Keiji Suzuki, Tokyo; Takeo Horiike, Kawagoe, all of Japan

[73] Assignee: Honda Giken Kogyo Kabushiki Kaisha, Tokyo, Japan

[21] Appl. No.: 876,912

[22] Filed: Apr. 30, 1992

Related U.S. Application Data

[62] Division of Ser. No. 621,883, Dec. 4, 1990, abandoned, which is a division of Ser. No. 287,062, Dec. 21, 1988, Pat. No. 4,989,665.

[30] Foreign Application Priority Data

| Dec. 21, 1987 | [JP] | Japan | 62-321536 |
| Mar. 29, 1988 | [JP] | Japan | 63-75721 |
| Mar. 29, 1988 | [JP] | Japan | 63-75722 |
| May 24, 1988 | [JP] | Japan | 63-124885 |
| Jun. 1, 1988 | [JP] | Japan | 63-132573 |

[51] Int. Cl.$^5$ ............................................. B62K 11/04
[52] U.S. Cl. ................................. 180/219; 180/311; 280/281.1; 280/288.2; 280/288.3
[58] Field of Search ............... 180/219, 215, 213, 311, 180/229; 280/281.1, 288.2, 288.3

[56] References Cited

U.S. PATENT DOCUMENTS

| 1,535,245 | 4/1925 | Perry | 164/135 |
| 4,585,086 | 4/1986 | Hiramatsu | 180/219 |
| 4,678,054 | 7/1987 | Honda et al. | 180/219 |
| 4,696,363 | 9/1987 | Enda | 180/219 |
| 4,727,953 | 3/1988 | Kudo et al. | 180/219 |
| 4,815,555 | 3/1989 | Kishi et al. | 180/219 |
| 4,852,678 | 8/1989 | Yamaguchi | 180/219 |
| 4,887,687 | 12/1989 | Asai et al. | 280/281.1 |
| 4,887,688 | 12/1989 | Horiike et al. | 180/219 |
| 4,989,665 | 2/1991 | Yamagiwa et al. | 280/281.1 |

FOREIGN PATENT DOCUMENTS

| 322305 | 6/1989 | European Pat. Off. | 180/219 |
| 728307 | 10/1942 | Germany | 164/363 |
| 352652 | 9/1937 | Italy | 164/363 |
| 59-185545 | 10/1984 | Japan | 164/136 |
| 61-129383 | 6/1986 | Japan . | |
| 62-31576 | 2/1987 | Japan . | |
| 62-96185 | 5/1987 | Japan . | |
| 254479 | 10/1989 | Japan | 180/219 |
| 2006653 | 5/1979 | United Kingdom | 164/363 |

Primary Examiner—Mitchell J. Hill

[57] ABSTRACT

A body frame for a motorcycle including a head pipe for supporting a rotary shaft for a handle, a pair of left and right main body frame elements, connected to the head pipe and extending rearwardly of the head pipe, a pair of left and right engine supporting members, connected to and extending downwardly from the main body frame elements adjacent to said head pipe, and a horizontally extending frame element connecting said left and right main body frame elements to each other at intermediate portions in the longitudinal direction. The engine is supported at least at a lower end portion of the left and right engine supporting members and intermediate portions in the longitudinal direction of the left and right main body frame elements and an upper end portion of a shock absorber is connected to the horizontally extending frame elements. A cast body frame is constructed of a light alloy and assembled by joining a leftward and a rightward divided block formed in shapes being vertically divided at the head pipe portion to each other. The main body frame elements are formed from a tubular member having a rectangular cross section wherein the widths of the opposite side walls are larger relative to the widths of upper and lower walls, and the widths of the side walls gradually vary from a front end portion connected to the head pipe to a rear end portion for forming at least a smaller area between the front end portion to the rear end portion.

11 Claims, 16 Drawing Sheets

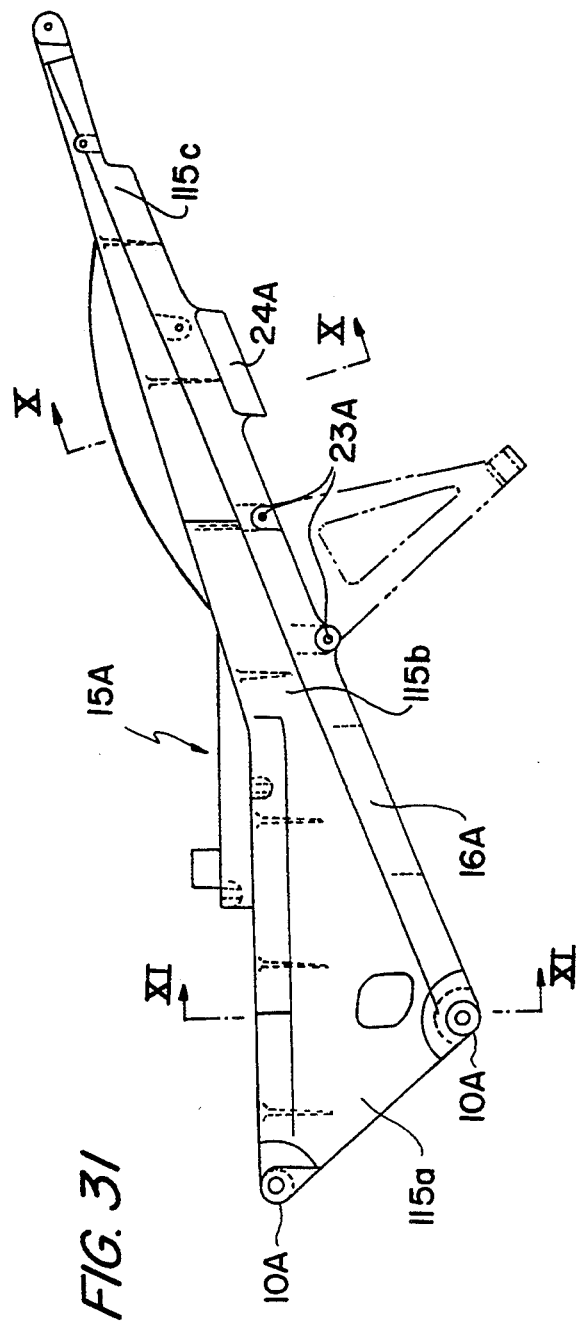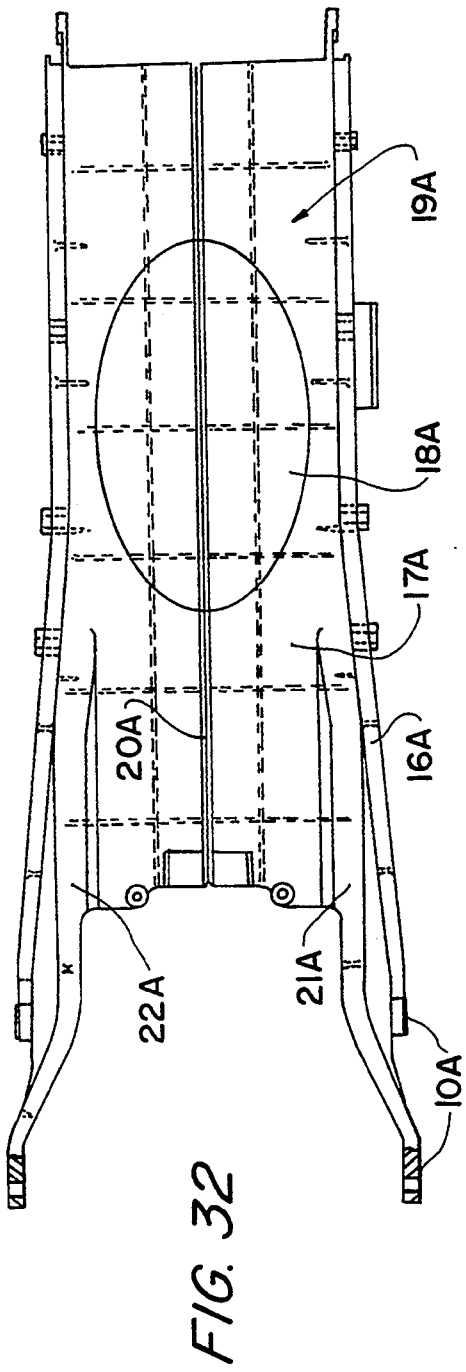
FIG. 31
FIG. 32

BODY FRAME FOR A MOTORCYCLE

This application is a divisional of copending application Ser. No. 07/621,883 filed on Dec. 4, 1990, now abandoned, which is a divisional application of Ser. No 07/287,062, filed on Dec. 21, 1988, now U.S. Pat. No. 4,989,665.

BACKGROUND OF THE INVENTION

1. Field of the Invention

This invention relates to a body frame for a motorcycle that is provided as a cast article made of a light alloy, and more particularly to a body frame of the type wherein an engine is used as a reinforcing member for the body frame. A hollow body frame is designed to reduce the production of noise. Further, a seat frame is provided that is formed as a unitary member.

2. Description of Background Art

Body frames for a motorcycle normally include a pipe frame wherein a plurality of pipe members are assembled as a unitary member by welding. A steel plate frame is also available wherein a pair of left and right steel plate half bodies, formed by press work, are joined to each other by welding such that a principal section of the frame may be a hollow section. Further, a composite frame of a steel pipe and a steel plate is also available.

A hollow body frame for a vehicle having a small size is formed from a steel pipe, a protruded light alloy pipe, a cast light alloy pipe or the like. Hollow body frames of this particular type are apt to generate resonance sounds at a location at which a noise producing body such as an engine or a motor is supported due to vibrations transmitted at these locations.

In the case of a pipe frame which is used widely, it is necessary to attach various projecting pieces for supporting members thereon to the pipe frame by welding. Further, reinforcing lugs are used for mutually coupling portions of pipe members. Prior to assembly, each pipe member must be drawn to provide a desired sectional shape to a location thereon and must be suitably bent to provide the same with a curved configuration. In addition, since each of the pipe members has a fixed sectional area, a reinforcing member must be applied to a location of the pipe member upon which a heavy load acts. Accordingly, in order to obtain a conventional welded pipe frame, a large number of parts and a large number of working man-hours are required.

To the contrary, where a body frame is formed by casting as disclosed in Japanese Patent Laid-Open No. 61-6084 and Japanese Patent Laid-open No. 62-31576, reinforcing ribs and supporting projecting pieces for various parts can be provided at the time of casting, and the number of working man-hours can be reduced significantly.

The inventors have made sufficient investigations over advantages in the production of a body frame by casting. It has been determined that not only a reduction in the number of working man-hours can be anticipated but also an optimum configuration which takes a load application into consideration can be adopted for a body frame of a particular type.

If a body frame made of a light alloy is to be constructed as a pair of left" and right divided half bodies or a unitary block by casting, it is very difficult to form a long size hollow portion having a thickness of material less than 4 mm to the same degree as a pipe material which is used for assembly of a known body frame made of an aluminum alloy.

Normally, a body frame constructed of an aluminum alloy is made as a large size cast article and is produced by gravity die casting. If an attempt is made to restrict the thickness of the material of a long size hollow portion to less than 4 mm for reduction in weight, the speed of molten bath in a dam that communicates and connects a runner and a cavity with and to each other is about 20 to 30 cm/sec by normal gravity die casting. Thus, the speed of the molten bath flowing into the cavity is insufficient so that the molten bath cannot fill the cavity. Thus, while it may seem recommendable to arrange the cavity in an inclined posture so that molten bath may be poured at a high molten bath speed through a dam communicating with an upper end portion of the cavity, the molten bath having passed the dam preferentially flows to corner portions of the cavity at a high speed due to the action of surface tension and thus closes an opening of the air exhaust path to prevent air within the cavity from escaping through the air exhaust path. Consequently, an article of a desired configuration cannot be obtained.

According to low pressure die casting, the speed at which molten bath passes a dam can be made higher than 50 cm/sec. However, the molten bath having passed the dam is advanced into a cavity like a jet so that such a phenomenon appears that a large amount of air, air bubbles, remain in a cast article. Also, solidification proceeds rapidly due to the fact that the cast article has a thin wall. Consequently, a good product having a desired strength and a desired extension characteristic cannot be obtained.

Further, while a technique is also known wherein a metal mold is preheated to remove remaining air bubbles to delay the solidifying speed of the molten speed, such a technique is cumbersome in that the temperature management of the metal mold must be strictly controlled.

A cast frame having two divided blocks is conventionally known and disclosed for example, in Japanese Patent Laid-open No. 61-129383. According to the cast frame, the motorcycle body is composed of a head pipe portion and a body frame portion extending downwardly and rearwardly in an inverted U-shape shape. The head pipe portion is formed by casting into two symmetrical left and right blocks including a head pipe along a dividing plane on a center line of a car body. The two blocks are coupled into a unitary member by a bolt connection and various stays are mounted thereon.

In a motorcycle frame formed by casting as two divided blocks, a front portion thereof is secured by means of a bolt by way of a flange formed on a head pipe portion. A rear portion thereof is secured by means of a bolt and a cross member. Although the car body frame is formed by casting, the number of man-hours for machining steps with regard to bolt holes, and assembling steps, such as assembly of the cross member and several stays, is increased. This leads to deterioration in productivity. In addition, the head pipe portion is formed into two divided portions, the accuracy at the head pipe portion cannot be attained and the strength of the head pipe portion is low.

Further, a seat frame extends rearwardly from an upper intermediate portion of the frame body, the number of man-hours for assembly is increased. Thus, productivity deteriorates because several stays and a mud guard are mounted on the seat frame.

The present invention utilizes products of press work for the seat frame, cross member, mud guard, several stays, etc. the strength of these members takes precedence. Some waste may appear in the shape of the members so that the entire motorcycle frame is increased in weight.

A seat frame, for example, as disclosed, in Japanese Patent Laid-Open No. 62-96185 is known for replacing a conventional seat frame that is constructed of welded pipes. The seat frame is constructed such that a pair of left and right frames of an inverted triangular truss construction serve as a pair of left and right seat rails and back stays which are mounted on and extend rearwardly form an intermediate upper portion of a main frame. The frames are formed by press work and are secured to each other by means of bolts using three cross members extending across upper faces of the two frames. Mounting bosses for various parts are welded to the two left and right frames and various brackets, stays, etc. are mounted on the mounting bosses. A spacing below the cross members is surrounded by the two left and right frames. The cross members are made as a spacing for rocking motion of a rear wheel.

SUMMARY AND OBJECTS OF THE INVENTION

It is an object of the present invention to provide a cast light weight body frame for a motorcycle of the type which is formed from, as principal parts, a head pipe for supporting a rotary shaft for a handle, a pair of left and right main body frame elements connected to the head pipe and extending rearwardly of a body and a pair of left and right engine supporting members connected to and extending downwardly from the main body frame elements near the head pipe. In addition, a horizontally extending frame element is provided for connecting the left and right main body frame elements to each other at intermediate portions in the longitudinal direction. An engine is supported at least at lower end portions of the left and right engine supporting members and intermediate portions in the longitudinal direction of the left and right main body frame elements. An upper end portion of a rear shock absorber is connected to the horizontally extending frame element. The body frame is a cast article made of a light alloy and with an optimum configuration that takes a load application into consideration to provide for reduction in weight of the body and also for a saving in material cost.

The above object of the present invention is attained by the provision of a body frame wherein it is formed as a cast article made of a light alloy and assembled by joining by welding two leftwardly and rightwardly divided blocks of such shapes that are vertically divided at a head pipe portion to each other. The main body frame elements are each formed as a pipe having a rectangular cross section wherein the widths of the opposite side walls are great compared to the widths of upper and lower walls, and the widths of the side walls gradually vary from a front end portion connected to the head pipe to a rear end portion for forming at least a smaller area between the front end portion to the rear end portion.

It is a second object of the present invention to provide for a body frame for a motorcycle, an optimum configuration for withstanding a load application for assuring sufficiently high strength and rigidity thereby to attempt reduction in weight of a car body and to save material cost.

It is a third object of the present invention to provide a casting mold for obtaining a long thin hollow member by gravity casting wherein the mold is suitable for casting of a body frame for a motorcycle made of a light alloy.

It is a fourth object of the present invention to provide a hollow body frame wherein production of noise is reduced.

It is a fifth object of the present invention to provide a motorcycle frame wherein the number of parts is reduced to the utmost to improve the productivity and attain a reduction in cost while improving accuracy and improving strength of the motorcycle frame having two divided blocks.

The second object is attained by the provision of a body frame wherein the hollow sectional area of a main frame pipe is greater at a location where the main frame pipe is connected to a member which transmits a load from a wheel to the main frame pipe and is smaller at the other portions. In addition, a body frame is provided wherein a peripheral wall of a main frame pipe includes a rib for reinforcing the peripheral wall or a partition wall for dividing the hollow portion into a plurality of chambers.

The third object is attained by the provision of a casting mold wherein a runner is formed which is inclined toward the lowermost position of a cavity of the casting mold placed in position for casting. The runner and the cavity are communicated with and connected to each other by way of a plurality of dams. Exhaust paths are formed for communicating at least with an upper portion of the cavity.

The fourth object is attained by filling an acoustic material or a damping material at least into part of a frame having a hollow structure. In the alternative, a frame may be provided having a hollow structure with a partition wall for partitioning the hollow structure frame into a plurality of chambers in the longitudinal direction. Further, a frame may be provided having a hollow structure with a partition wall for partitioning the hollow structure frame into a plurality of chambers in the longitudinal direction and filling an acoustic material or a damping material at least into one of the chambers.

The fifth object is attained by a car body frame for a motorcycle that is composed of a head pipe portion and a body frame portion extending rearwardly from the head pipe portion and a body frame portion extending rearwardly from the head pipe portion. The body frame portion is composed of divided frames that are individually formed by casting and divided in leftward and rightward directions. The head pipe portion is formed in an integral relationship on one of the divided frames by casting and the divided frames are coupled into a unitary member.

If a molten bath is poured by way of a gate (b), while a casting mold (a) for obtaining a long size hollow body by gravity casting is used in an inclined condition, such that a long size cavity (e) and a long size runner (c) extends just below and adjacent the cavity (e) are inclined as shown in FIG. 19, then filling of the molten bath into the long size cavity (e) can be effected smoothly, as illustrated in the drawings, reference symbol (h) denotes a core. The characteristic of the technique resides in that the difference H in height between a bath pouring port (f) and a lower end of the cavity (e) or else an inclination angle e of the casting mold with respect to a horizontal plane HL, is assured relatively great so that the speed of molten bath passing a lowermost one of dams (d) is increased. By suitably selecting the inclination angle $\Theta$, it is possible to make the speed of molten bath passing the lowermost dam (d) to 1 to 2 m/sec. Molten bath having passed the same (d) continuously fills the cavity (e) from below to above. Accordingly, although the speed of molten bath passing the dam (d) is high, movement of the molten bath within the cavity (e) is gentle, and the entrances of the exhaust paths (g) are not closed at an early stage but at least an uppermost one of the exhaust paths (g) remains in a communicating condition until the inside of the cavity (e) is fully filled by the molten bath. Accordingly, gas within the cavity (e) is discharged with certainty through the exhaust paths (g).

Further, the runner (c) has a long length similarly to the cavity (e). Thus, while the molten bath passes the long path, the temperature of the molten bath is lowered significantly so that solidification of the molten bath which has initially advanced to a lower end portion within the cavity (e) progresses rapidly. The solidification of the molten bath has an ideal solidifying manner wherein it progresses upwardly, directive solidification, and dissolved gas which appears as the solidification progresses escapes successively upwardly through the high temperature molten bath above and is discharged through the exhaust paths (g).

Accordingly, with such a technique as described above, a cast article and products, of a proper structure having no defect can be obtained. Further, the production of a large size cast article having a thickness of material of 2.0 to 3.5 mm and a surface area of 500 cm$^2$ or more may be achieved.

FIGS. 20 and 21 show examples of a casting mold for casting hollow bodies of various configurations.

The casting mold $a_1$ shown in FIG. 20 is designed to cast a hollow body wherein one end side thereof is greater in diameter than the other end side thereof. If casting is effected in a condition wherein a cavity (e) and a runner (c) are inclined such that the greater diameter side may be positioned higher than the smaller diameter side, discharge of dissolved gas can be readily achieved.

The casting mold $a_2$ shown in FIG. 21 is designed to cast a hollow body that is closed at an end thereof. The casting should be effected in a condition wherein a cavity (e) and a runner (c) are inclined such that the closed end side may be located at a lower position. Thus, a good condition of the closed end portion of the hollow body which is solidified at an early stage is assured. Discharge of dissolved gas from the other open end side is readily effected.

A casting mold $a_3$ shown in FIG. 22 is designed to cast a hollow spherical body, jar-like bodies, having an opening at a location thereof. It is preferable to set a cavity (e) so that the open portion may be located at an upper position and to incline a runner (c). It is further preferable to form the cavity (e) such that the length of the tubular opening end portion may be greater than an aimed product dimension. Also in this instance, upward discharge of dissolved gas is readily achieved. Because the outer diameter of the upper end portion is relatively small, part of the bubbles are apt to remain at the uppermost tubular opening end portion when the molten bath solidifies. Thus, by cutting off the portion after casting, a product having no defect can be obtained.

FIGS. 23 and 24 show examples of preferable configurations of a dam (d). The dam $d_1$ shown in FIG. 23 has a diameter that continuously decreases from a runner (c) toward a cavity (e) while the dam $d_2$ has a diameter which decreases in a step-like configuration from a runner (c) to a cavity (e). By decreasing the diameter of a dam gradually in this manner, filing of the molten bath can be achieved in such a manner that jetting of the bath into a cavity at a high flow speed is restricted and the molten bath springs out gently from a lower portion toward an upper portion of the cavity, and the molten bath will not scatter within the cavity.

When an acoustic material or a damping material fills the inside of a hollow body frame, vibration noises within the hollow body frame are absorbed by the acoustic material or vibrations propagated to the hollow body frame are dampened by the damping material. A porous material, for example, of an air bubble type, is suitable for the acoustic material. Further, an elastomer which is a visco-elastic material is suitable for the damping material.

If a partition wall is provided in the inside of a hollow body frame to separate the inside of the hollow body frame into a plurality of chambers, production of resonance sounds in a relatively low frequency region can be prevented. It is further effective to provide a partition wall within a hollow body frame and to fill an acoustic material or a damping material at least into one of the inner chambers which corresponds to a location connecting to a vibration generating source.

When an acoustic material or a damping material is to fill into the inside of a hollow body frame, where the hollow body frame is either a welded pipe or an extruded pipe, an open end, a threaded hole or the like, should be utilized. However, if the hollow body frame is a cast article, a sand removing hole through which sand of a core is removed should be utilized.

Foamed polyurethane resins can be listed as an example of filler having a sound absorbing action and a damping action. Foamed polyurethane resins are divided into soft, semi-rigid and hard resins. A soft material is a continuous air bubble body and is superior in sound absorbing property. A semi-rigid material has independent air bubbles in a surface layer thereof and has continuous air bubbles in the inside thereof. A hard material has independent air bubbles in the entirety thereof. While a semi-rigid material and a hard material are inferior in sound absorbing property to a soft material, since they are visco-elastic bodies, a vibration damping effect by high internal friction can be obtained by them. Accordingly, a semi-hard material is most superior as a material that meets both of the characteristics of the sound absorbing property and the damping property. Foamed polyurethane resins are obtained by a reaction between isocyanate and polyether, and actually, a foaming agent, a catalyst and other materials are additionally mixed in such resins. If raw material liquids of the above substances are mixed and poured into a hollow body frame, air bubbles are produced within the hollow body frame to fill the inside spacing of the hollow body frame until the raw material liquids are closely contacted with inner wall faces of the frame. Pouring of raw material liquid can be conducted utilizing a small threaded hole or the like, and its operation is simple. While foamed material may be filled over the entire length of a hollow body frame, an effect can be obtained even if foamed material is filled only into a location at which an engine or the like which is a vibration generating source is supported or into a location near the location. This provides an economically advantageous technique. In this sense, it is effective to partition the inside of a cast hollow body frame into a plurality of chambers by means of a partition wall and fill foaming material only into one of the chambers nearest to a vibration generating source making use of a sand removing hole.

In the embodiment wherein the motorcycle frame is cast in two divided blocks, connecting the divided frames to each other is formed in an integral relationship on at least one of the divided frames by casting. Further, the, motorcycle is composed of a head pipe portion and a body frame portion extending rearwardly from the head pipe portion. A seat frame extends rearwardly from an intermediate upper portion of the body frame portion. A cross member is provided for the seat frame. Several stays are provided on the seat frame and a mud guard is disposed above a rear wheel. The members are divided in leftward and rightward directions on a dividing plane along the direction of the length of the motorcycle and are formed by casting and coupled into a unitary member by welding.

By casting the motorcycle frame in a condition wherein the cross member, several stays, mud guard and other elements are incorporated and assembled into a unitary member by welding, the number of parts can be reduced. Further, the locations can be reduced. Further, the locations to be worked for both holes or for connecting various parts by welding can be reduced.

By incorporating the head pipe portion into one of the divided frames that are cast in an integral relationship, the dividing plane can bypass the head pipe portion to retain the strength of the head portion. The accuracy of the head pipe portion after casting may be attained comparatively easily.

A spacing is provided below the cross members for rocking motion of the rear wheel. A mud guard is provided in the spacing, particularly in the case of a motorcycle for off road use, wherein the stroke of rocking motion of a rear wheel is great. It cannot be avoided to position upper edges of the two left and right frames at relatively high positions. Consequently, there is a problem that the height of the seat is necessarily great.

It is another object of the present invention to provide a seat frame for a motorcycle wherein the height of a seat is restricted relatively low to improve the foot placement of an individual. It is a further object of the present invention to provide a seat frame for a motorcycle wherein a front portion of a mud guard is formed in an integral relationship.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 31 is a side elevational view showing another embodiment of the present invention;

FIG. 32 is a plan view of FIG. 31;

DETAILED DESCRIPTION OF THE PREFERRED EMBODIMENTS

In the following, an embodiment of the present invention shown in FIGS. 1 to 18 will be described.

Figure 1:
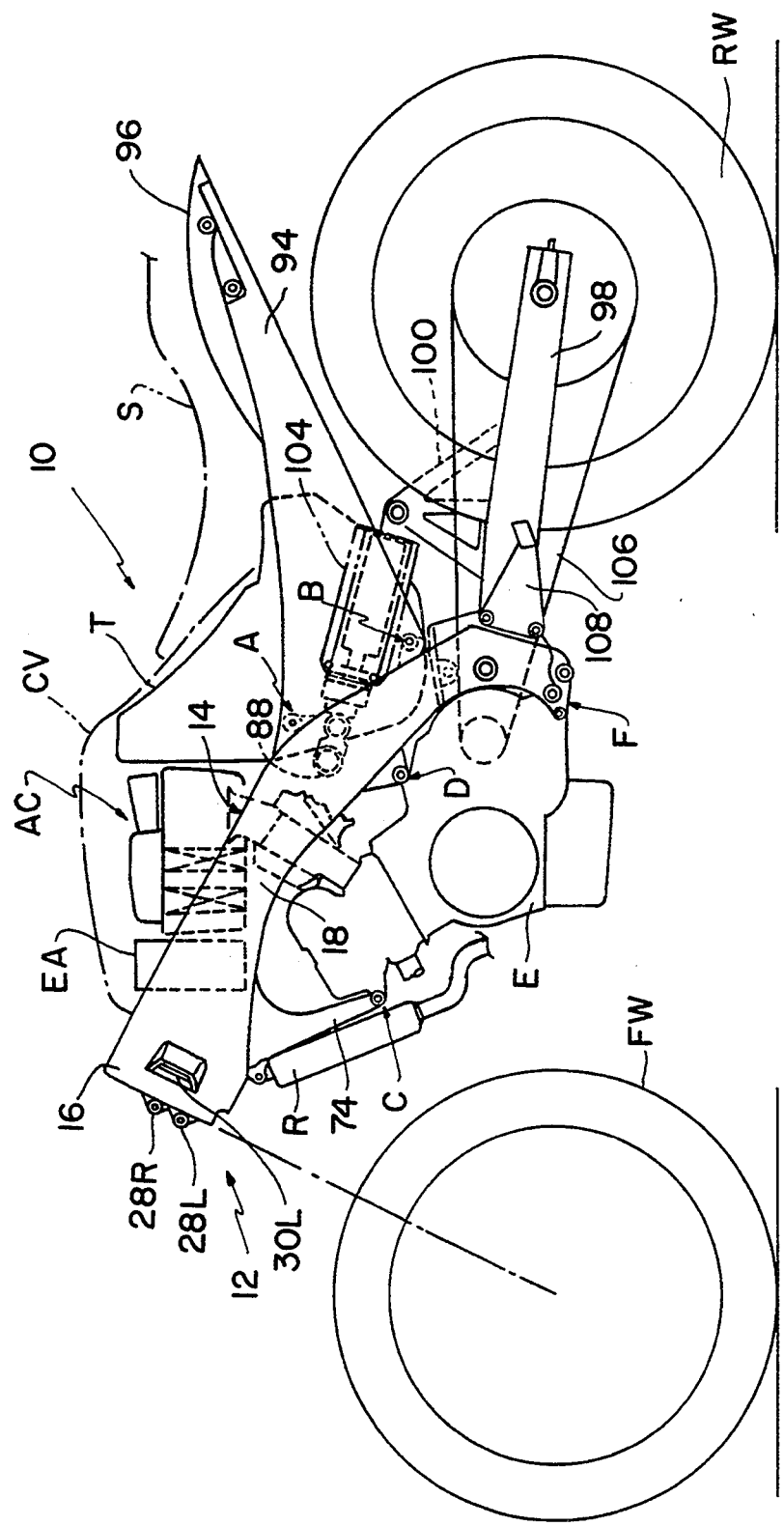
FIG. 1 is a side elevational view of a motorcycle which employs a body frame according to an embodiment of the present invention.

FIG. 1 shows a motorcycle 10 as a schematic side elevational view of the essential parts. The motorcycle 10 carries an engine E between front and rear wheels FW and RW thereof.

Figure 2:
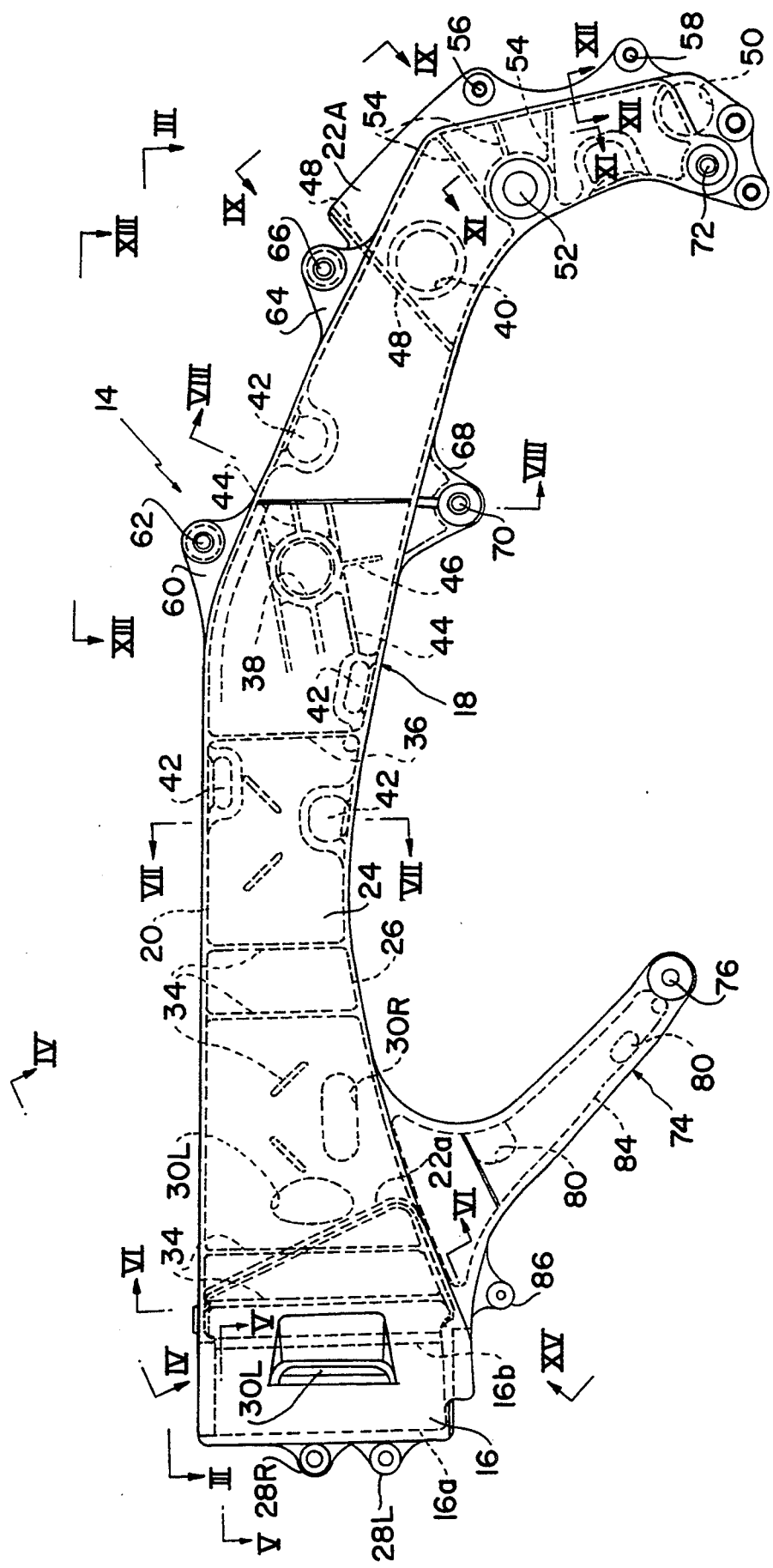
FIG. 2 is a left-hand side elevational view of a front body frame which is a principal part of the body frame.
Figure 3:
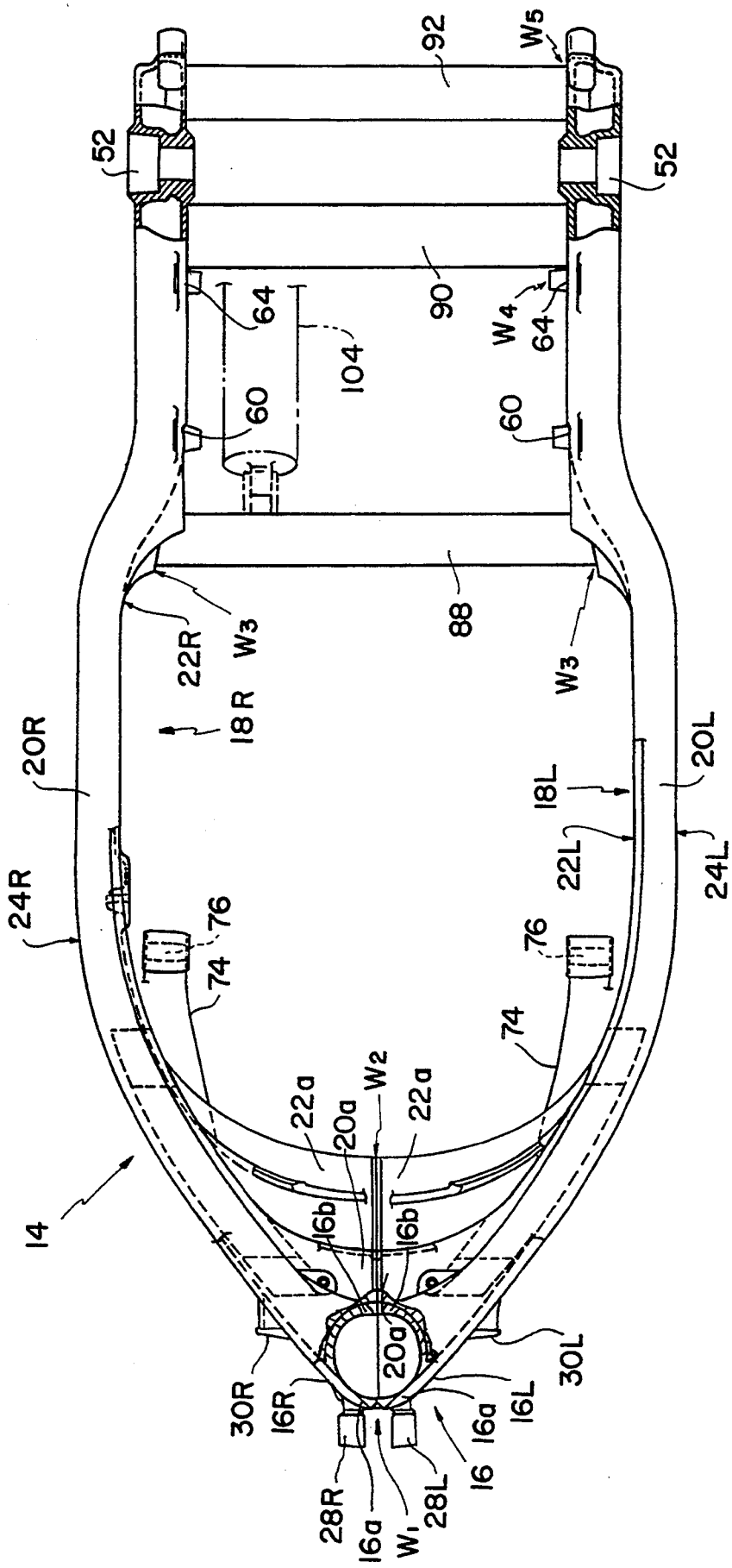
FIG. 3 is a top plan view of the body frame.
Figure 4:
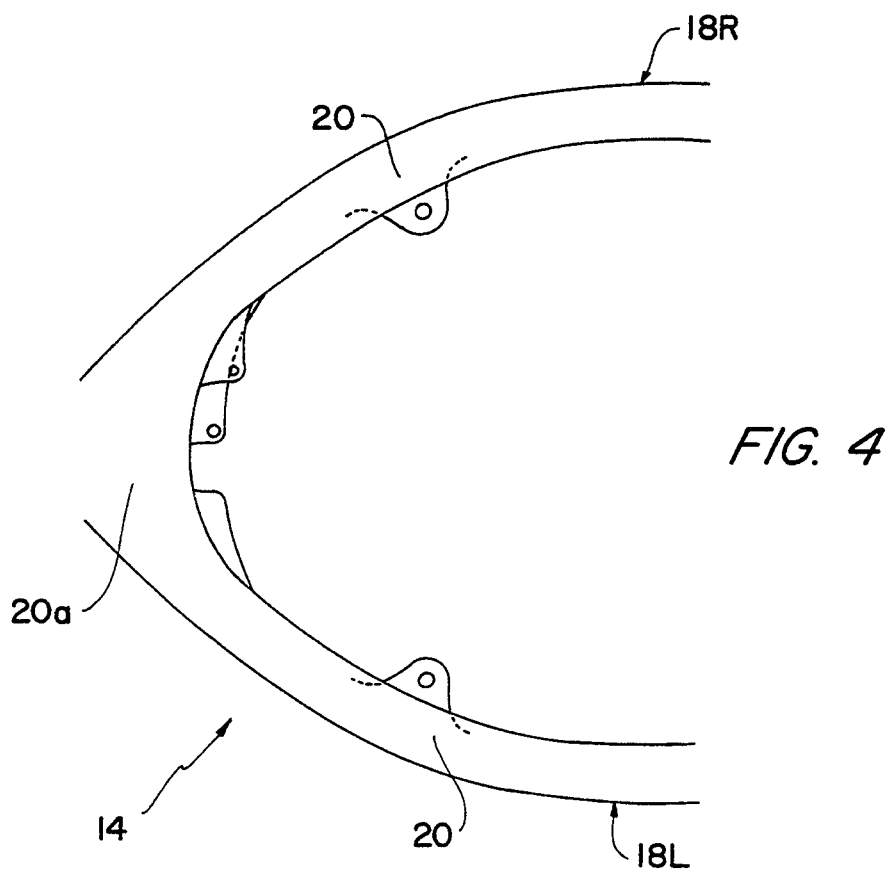
FIG. 4 is a view as viewed in the direction of arrow marks along line IV—IV in FIG. 2.

A body frame 12 of the motorcycle 10 is composed of a front body frame 14 and a rear body frame 94. The front body frame 14 is in the form of a cast article made of a light alloy and is composed of a head pipe 16, and a pair of left and right main body frame pipes 18 connecting to the head pipe 16 at a location where a load from a wheel is transmitted to said main body frame element and extending rearwardly of the motorcycle body. In addition, first engine supporting members, hereinafter referred to as a pair of left and right engine supporting pipes 74, are connected to the main body frame pipes 18 near the head pipe 16 and extend downwardly from the main body frame pipe 18 at a predetermined acute angle relative to the longitudinal axis of the head pipe 16. A first horizontally extending frame pipe 88 is provided for connecting the left and right main body frame pipes 18 to each other at intermediate portions in the longitudinal direction of the frame pipes 18. A second horizontally extending frame pipe 90 and a third horizontally extending frame pipe 92 is provided for connecting the left and right main body frame pipes 18 to each other at locations lower than the first horizontally extending frame pipe 88 (FIGS. 1 to 3). The rear body frame 94 is securely screwed to the front body frame 14 at two points A and B on each of the left and right sides is a body having a substantially triangular shape in side elevation and is formed in an integral relationship with a rear fender 96. A seat S is placed on the rear body frame 94, and a fuel tank T is accommodated and disposed in a front half portion of the rear body frame 94 which has a configuration such that arms thereof are extended rearwardly. An upper half portion of the fuel tank T is covered with a cover member CV together with an air cleaner AC and electric equipments EA such as a battery.

The engine E is supported on the body frame 12 at points C which are lower ends of the left and right engine supporting pipes 74. In addition, the engine E is supported at other points D which are intermediate portions in the longitudinal direction of the left and right main body frame pipes 18 and further points F which are lower ends of the left and right main body frame pipes 18. It is to be noted that the engine E functions as a member for reinforcing the main body frame pipes 18. A radiator R is provided in front of the engine E.

A rear fork 98 is provided for mounting the rear wheel RW and is supported for rocking motion by a support shaft 102 near lower ends of the main body frame pipes 18, and a rear shock absorber 104 is provided between the first horizontally extending frame pipe 88 and a shock absorber receiving member 100 provided projectingly at a front half portion of the rear fork 98.

FIGS. 3 to 16 show a detailed configuration of the front body frame 14. The front body frame 14 is assembled by left and right half bodies of symmetrical configurations which are cast independently of each other and are thereafter welded to each other at locations $W_1$ and $W_2$. The opposite end portions of the first, second and third horizontally extending frame pipes 88, 90 and 92 are fit into openings or holes of the individual half bodies and welding thereto at positions $W_3$, $W_4$ and $W_5$. Hereinafter, when distinction is to be made between the left and right half bodies, a suffix L or R is added to each reference numeral so that a reference symbol is represented, for example, as 18L or 18R.

Figure 5:
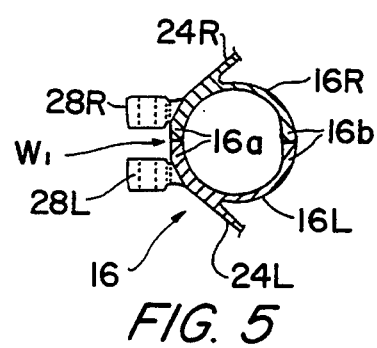
FIG. 5 is a sectional view taken along line V—V in FIG. 2.
Figure 6:
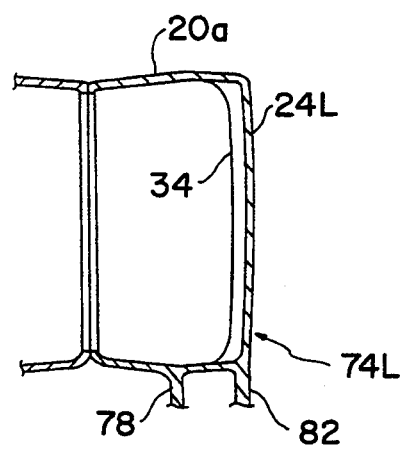
FIG. 6 is a sectional view taken along line VI—VI in FIG. 2.

The main body frame pipes 18 are each formed as a pipe of a rectangular cross section composed of an upper wall 20, an inner side wall 22, an outer side wall 24 and a lower wall 26. The heights of the inner and outer side walls 22 and 24 are sufficiently great in comparison with the widths of the upper wall 20 and the lower wall 26. The left and right main body frame pipes 18L and 18R are curved moderately toward the head pipe 16 so that they are confronted and joined with each other ($W_1$) at the front walls 16a and 16a of the head pipe half bodies 16L and 16R formed in an integral relationship and they are also confronted and joined with each other ($W_2$) at front end portions 22a and 22a of the inner side walls 22L and 22R inclined with respect to an axial line of the head pipe 16. Front end portions 20a and 20a of the upper walls 20L and 20R and front end portions of the lower walls 26L and 26R are also joined together. However, rear walls 16b and 16b of the head pipe half bodies 16L and 16R are only held in contact with each other and not joined to each other by welding. Further, fairing mounting projecting members 28L and 28R extend in the direction of the axial line of the head pipe 16 and having different heights are provided projectingly on the head pipe half bodies 16L and 16R, respectively, as illustrated in FIG. 5.

The front walls 16a of the head pipe 16 and the outer side walls 24 of the main body frame pipes 18 are connected to each other with smooth curved faces, and a pair of outer windows 30L and 30R are provided in the curved face portions for passing therethrough electric wires directed out from the electric equipments EA such as the battery. Inner windows on the side of the inner walls 22 are paired with the outer windows 30L and 30R and are denoted by 32L and 32R.

The outer side wall 24 of each of the main body frame pipes 18 is curved and swollen moderately outwardly (FIGS. 7 and 8) in sectional configuration thereof. A plurality of stiffening ribs 34 are provided adjacent a first connecting portion of the main body frame pipe where the head pipe is in connection with the main body frame pipe, for restraining production of vibration noises. The stiffening ribs 34 project on an inner face of the outer side wall 24 (pipe inner face) in a location within the main body frame pipe 18 which has a hollow sectional area with an increased dimension. While the ribs 34 project with a relatively small height on the inner face of the outer side wall 24, a partition wall 36 is integrated with the entire peripheral walls 20, 22, 24 and 26 to partition the inside of the main body frame pipe 18 into two front and rear chambers.

Figure 7:
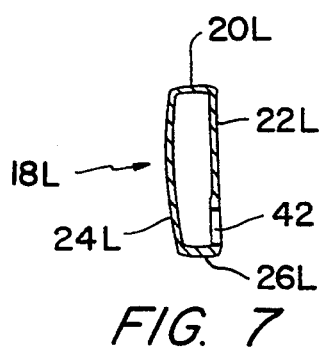
FIG. 7 is a sectional view taken along line VII—VII in FIG. 2.
Figure 8:
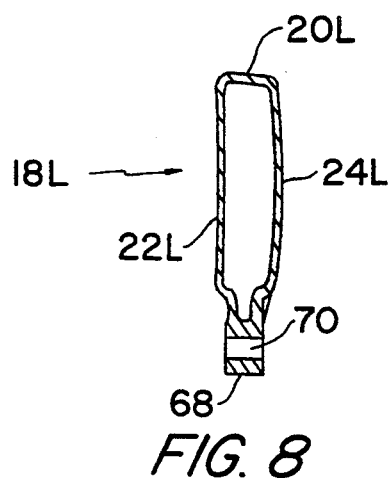
FIG. 8 is a sectional view taken along line VIII—VIII in FIG. 2.

The inner side wall 22 of each of the main body frame pipes 18 is formed as a straight wall body (FIGS. 7 and 8) and has formed therein a plurality of openings. More specifically, an opening 38 is provided for fitting with the first horizontally extending frame pipe, another opening 40 is provided for fitting with the second horizontally extending frame pipe and a plurality of further openings 42 originate from core prints for a core that is formed upon casting. FIG. 7 illustrates a cross section of an intermediate portion of the main body frame pipe which has a decreased sectional area and further illustrates one of the openings 42. A plurality of ribs 44 extend in the forward and rearward directions of the body in parallel to each other from portions around the opening 38 for the first horizontally extending frame pipe and a rib 46 extends downwardly from a portion around the opening 38. The ribs 46 are provided and project on an inner face of the inner side wall 22. The ribs 44 extend in a direction which coincides with the direction of the axial line of the rear shock absorber 104 in order to improve the flexural rigidity of the inner side wall 22 against a load acting in that direction.

Figure 9:
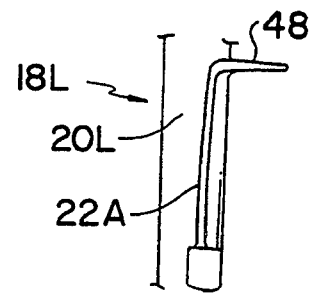
FIG. 9 is a view as viewed in the direction of arrow marks along line IX—IX in FIG. 2.

Meanwhile, a flange 48 for guiding a chain is provided on an intermediate portion of the main body frame pipe 18 which has a decreased sectional area. The flange 48 projects on an outer face of the inner side wall 22L and is located very near above the opening 40 for the second horizontally extending frame pipe and extends to a flange-like extension 22A of the inner side wall 22L, as illustrated in FIGS. 2 and 9.

Figure 10:
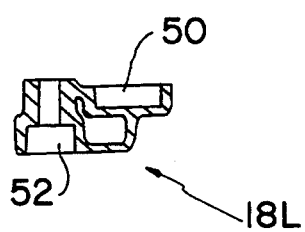
FIG. 10 is a sectional view of the elements illustrated at the lower right-hand portion of FIG. 2.

It is to be noted that a hole 50 for the third horizontally extending frame pipe is formed on the inner side wall 22 and located below the hollow portion of each of the main body frame pipes 18, as illustrated in FIGS. 2 and 10.

Figure 11A:
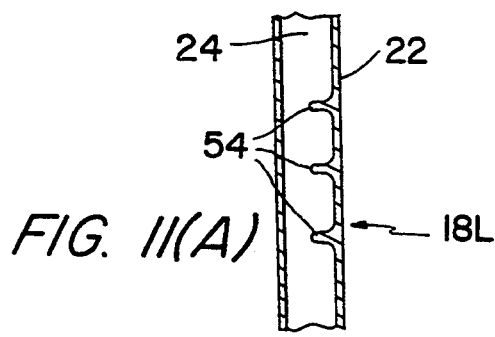
FIG. 11A is a sectional view taken along line XI—XI in FIG. 2.

Further, a bearing opening 52 is formed at a location between the opening 40 and the hole 50 and extends through each of the main body frame pipes 18 in the leftward and rightward directions as illustrated in FIGS. 2 and 10. A support shaft 102 for the rear fork 98 is supported in the openings 52. Near each of the openings 52, the inner side wall 22 is reinforced, and three ribs 54 are provided that project on an inner face of the inner side wall 22, the pipe inner wall, as illustrated in FIG. 11. A partial sectional view of the flange-like extension 22A includes a configuration wherein the inner side wall 22 is extended rearwardly of the body within a range in which the openings 40, 52 and 50 are located as shown in FIGS. 2 and 10. Screwing openings 56 and 58 for mounting a foot supporting member 108 are formed in the flange-like extension 22A.

Figure 13:
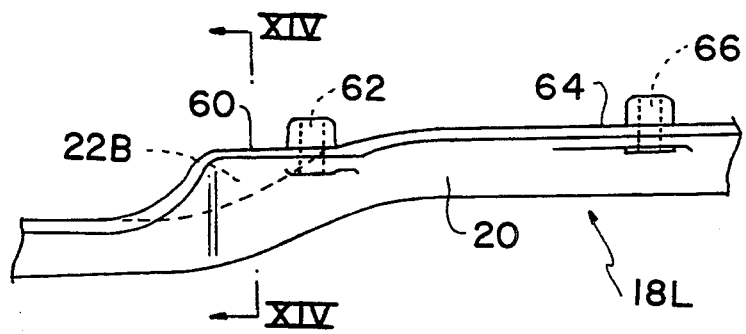
FIG. 13 is a view as viewed in the direction of arrow marks along line XIII—XIII in FIG. 2.
Figure 14A:
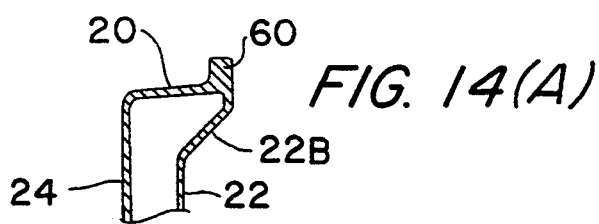
FIG. 14A is a sectional view taken along line XIV—XIV in FIG. 13.
Figure 14B:
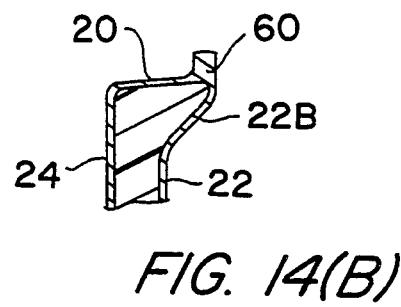
FIG. 14B is a sectional view similar to FIG. 14A and includes a material disposed in the cavity thereof.
Figure 15:
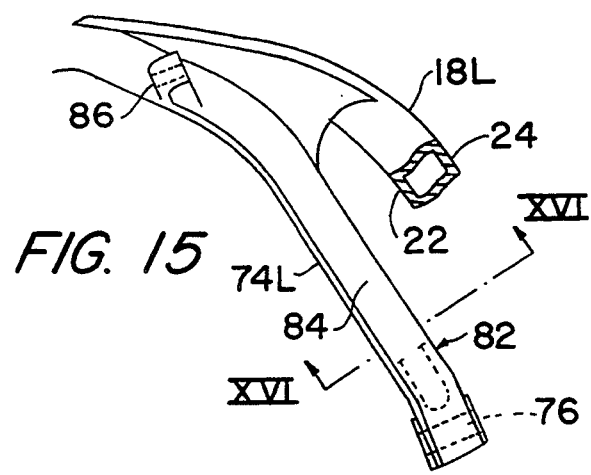
FIG. 15 is a view as viewed in the direction of arrow marks along line XV—XV in FIG. 2.
Figure 16:
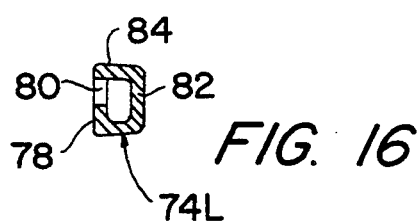
FIG. 16 is a sectional view taken along line XVI—XVI in FIG. 15.

A pair of front and rear projecting members 60 and 64 extend from an upper face of each of the main body frame pipes 18 and are provided for mounting thereon the rear body frame 94 on which the seat S is supported. Screwing openings 62 and 66 are formed in the projecting pieces 60 and 64, respectively, as illustrated in FIGS. 2 and 13. It is to be noted that the location at which the projecting member 60 is formed is a location at which the main body frame pipe 18 is curved in the widthwise direction of the motorcycle. The distance between the left and right main body frame pipes 18L and 18R is greater at the front half portion than at the rear half portion. In view of the fact that the weight of a rider is received by the curved location, the width of the upper wall 20 is increased locally and an upper portion 22B of the inner side wall 22 is constructed in such a configuration that it is swollen to the side of the center of the body in the widthwise direction of the motorcycle as illustrated in FIGS. 2, 13 and 14.

A projecting member 68 projecting from a lower face of each of the main body frame pipes 18 at a second engine supporting portion where the hollow sectional area has an increased dimension. The projecting member 68 is provided for supporting the engine E thereon, as illustrated by point D in FIG. 1. The projecting member 68 is located below the projecting member 60 and the opening 38. At this position, the heights of the inner side wall 22 and the outer side wall 24 are increased relative to the heights at the rear end portions or the lower end portions. In particular, the heights of the inner side wall 22 and the outer side wall 24 increase gradually from the rear end portions, or the lower end portions, toward the positions of the projected piece 60, the opening 38 and projecting member 68 and then decrease once again at one end thereof toward the head pipe 16 side and then increase again until they connect to the head pipe 16 as illustrated in FIG. 2. An opening 72 located at the lower end portion of each of the main body frame pipes 18 is provided for supporting the engine E thereon similarly to the opening 70 of the projecting member 68 as illustrated by point F in FIG. 1.

The pair of left and right engine supporting pipes 74 connected to the lower faces of the main body frame pipes 18 near the head pipe 16 at a second connecting portion where the main body frame pipe 18 has a hollow sectional area with an increased dimension. The supporting pipes are each in the form of a body having a rectangular cross section and have engine supporting openings 76 at lower ends thereof. Inner chambers of the engine supporting pipes 74 are independent of the inner chambers of the main body frame pipes 18. A pair of openings 80 originating from core prints for a core upon casting are formed in an inner side wall 78 of each of the engine supporting pipes or members 74. An outer side wall 82 connects, at an outer side surface thereof in the widthwise direction of the car, smoothly to a surface of the outer side wall 24 of the main body frame pipe 18. A projecting member 86 is provided that projects on a front wall 84 of the engine supporting pipe 74 for supporting the radiator R thereon as illustrated in FIGS. 1, 2, 15 and 16.

A front end portion of the rear body frame 94 having a triangular shape as viewed in side elevation is secured by screwing to the projected pieces 60 and 64 of the front body frame 14 made in such a configuration as described above a illustrated in FIGS. 1 and 2.

It is to be noted that, where the first horizontally extending frame pipe 88 is formed in an integral relationship with the main frame pipes 18L and 18R by casting, the projecting members for supporting the upper end of the rear cushion 104 thereon should be provided by monoblock casting such that it may project upwardly farther than the main frame pipes 18 as viewed from a side direction of the motorcycle. Thus, the drilling of the projecting member can be easily achieved.

Figure 17:
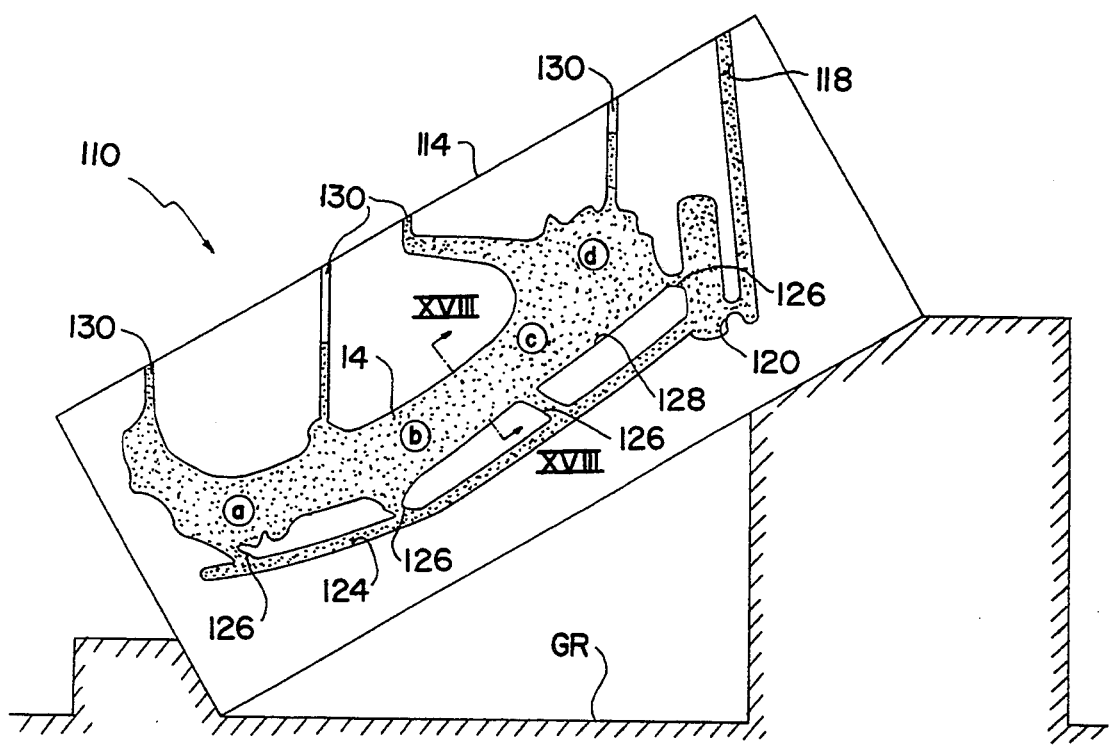
FIG. 17 is a view illustrating a manner of casting the front body frame.
Figure 18:
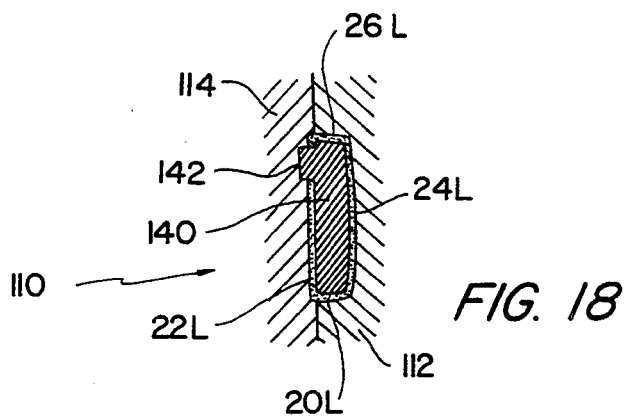
FIG. 18 is a sectional view taken along line XVIII—XVIII in FIG. 17.
Figure 19:
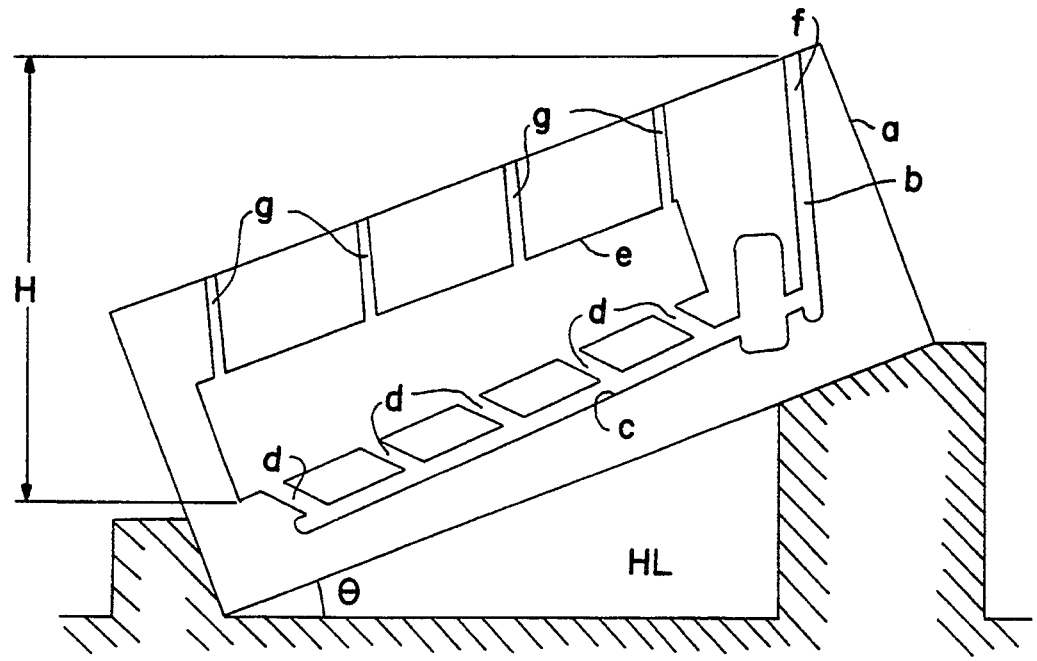
FIG. 19 is a schematic view showing an example of a metal mold used for gravity die casting.
Figure 20:
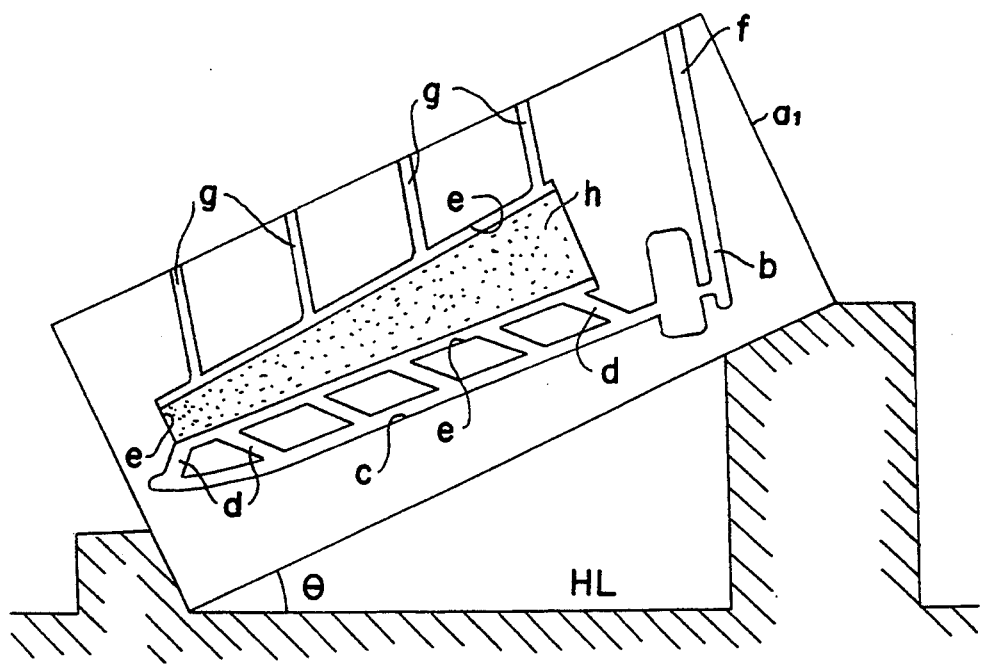
FIG. 20 is a schematic view showing an example of a metal mold used for gravity die casting.
Figure 21:
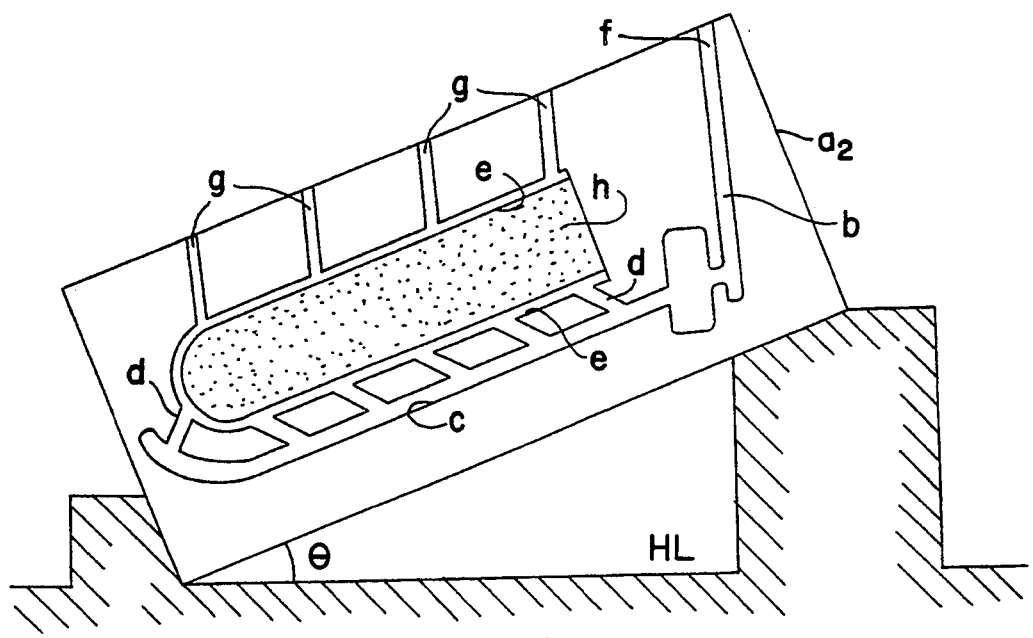
FIG. 21 is a schematic view showing an example of a metal mold used for gravity die casting.
Figure 22:
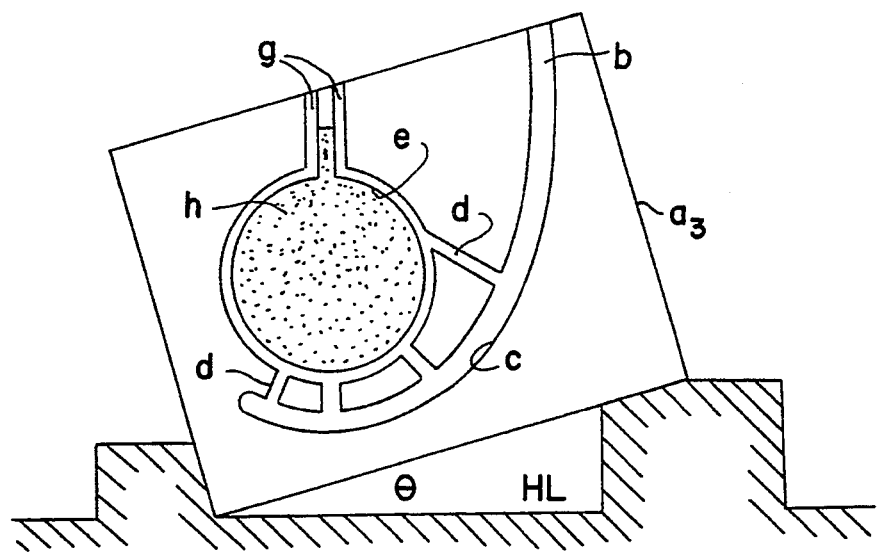
FIG. 22 is a schematic view showing an example of a metal mold used for gravity die casting.
Figure 23:
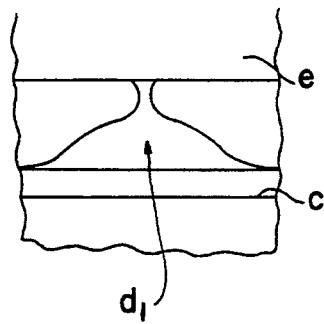
FIG. 23 is a view showing preferable dam configurations for the metal molds.
Figure 24:
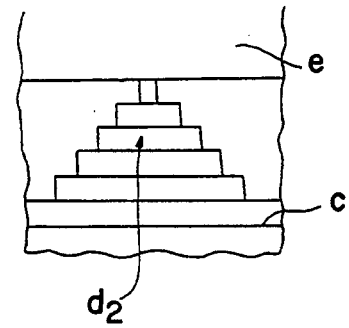
FIG. 24 is a view showing preferable dam configurations for the metal molds.
Figure 25:
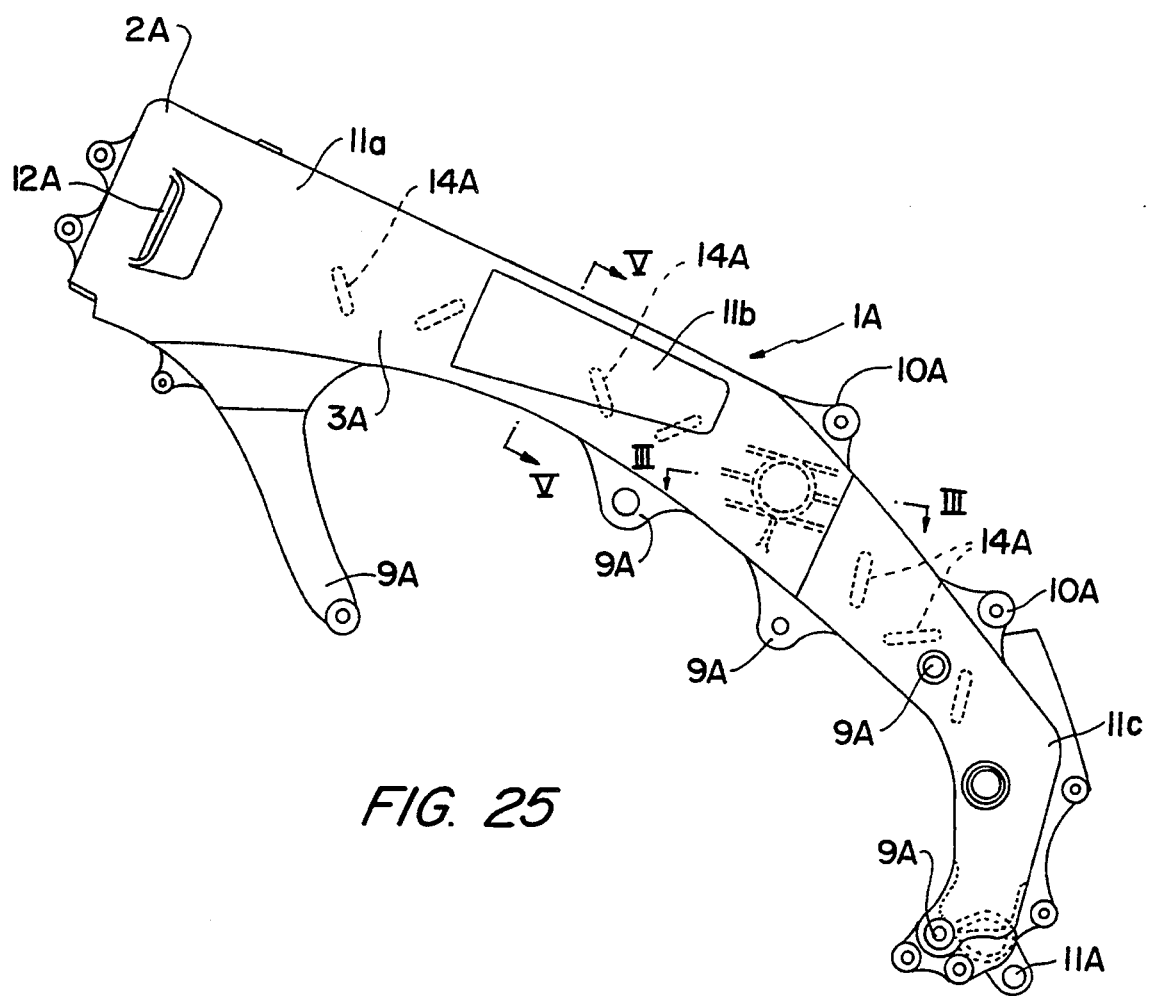
FIG. 25 is a side elevational view showing an embodiment of another embodiment of the present invention.
Figure 26:
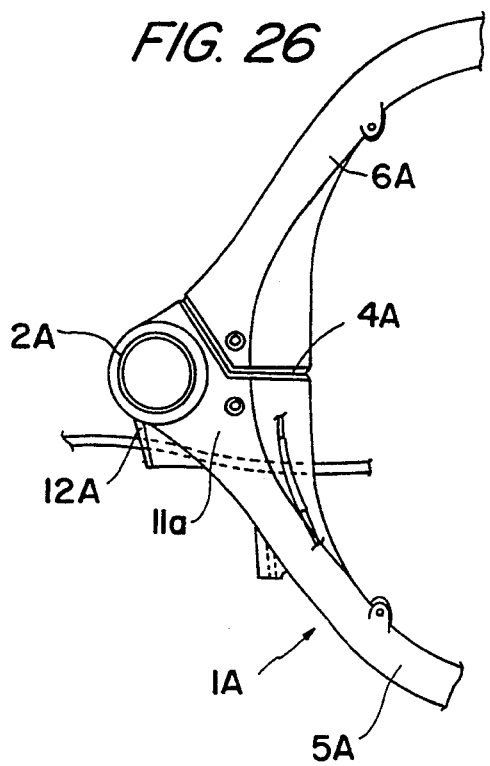
FIG. 26 is a plan view of a front portion of a motorcycle body frame.
Figure 27:
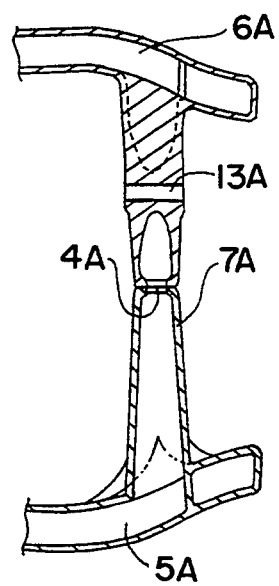
FIG. 27 is a sectional view taken along line III—III of FIG. 25.
Figure 28:
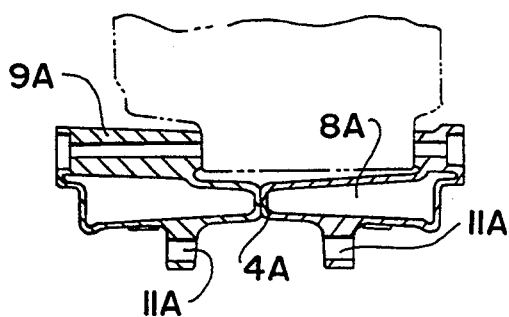
FIG. 28 is a sectional view of elements 9A and 11A illustrated at the lower right-hand portion of FIG. 25.

A method of casting the front body frame 14 will be described hereinafter. FIGS. 17 and 18 illustrate a manner in which the left-hand side half body of the front body frame 14 is constructed. A casting metal mold 110 is composed of a first metal mold 112 for forming outer face sides in the widthwise direction of the motorcycle of the head pipe 16 the main body frame pipe 18L and engine supporting pipe 74L. A second metal mold 114 is provided for forming inner face sides of the body frame. The mating faces of the two metal molds 112 and 114 are set in a location at which the upper and lower walls 20L and 26L, and the inner side wall 22L of the main body frame pipe 18L are connected to each other, as illustrated in a corner portion, in section in FIG. 18.

A metal mold 110 includes a gate 118, a basin 120, a runner 124, dams 126, a cavity 128 and air exhaust paths 130 formed therein. If a molten bath is poured into the metal mold 110 from the gate 118 while a core 132 is supported in the cavity 128 by core prints 134 and the position of the casting metal mold 110 is inclined as shown in FIG. 17, the molten bath will pass the basin 120 and the individual dams 126 and fill the cavity 128 in the order of (a)-(b)-(c)-(d). Action (d) is the head pipe forming portion. Consequently, the molten bath will not readily be disturbed within the cavity 128, and production of pin holes, air bubbles, will be prevented. Further, since the molten bath is filled in the order beginning with the area (a) of the cavity which is located farthest from the basin 120, heat retention of the metal mold 110 is easy. It is to be noted that air within the cavity 128 will escape to the outside air by way of the air exhaust path 130.

An exhaust path 130 is located at the highest position until after a point in time when the casting is completed. Consequently, discharge of the air within the cavity 128 and discharge of gas from the molten bath as solidification proceeds will take place smoothly. As a result, production of air bubbles remaining in a product can be effectively prevented. Further, since the molten bath is filled in the order of beginning with the region of the cavity which is located farthest from the basin 120, the temperature of a portion of a wall of the metal mold which is at a vertical level of a surface of the bath which is successively rising is already increased before the bath reaches this particular point. Accordingly, a dead head effect can be anticipated. Also in this regard, air bubbles can be prevented from remaining in the molten bath.

Figure 11B:
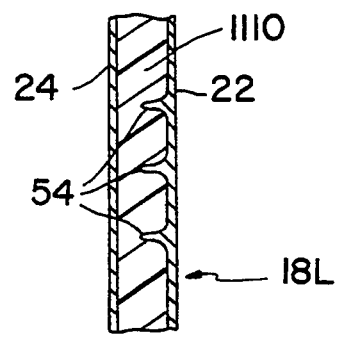
FIG. 11B is a sectional view similar to FIG. 11A and includes a material disposed in the cavity thereof.
Figure 12A:
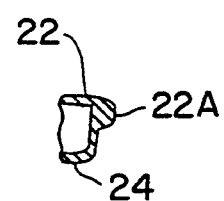
FIG. 12A is a sectional view taken along line XII—XII in FIG. 2.
Figure 12B:
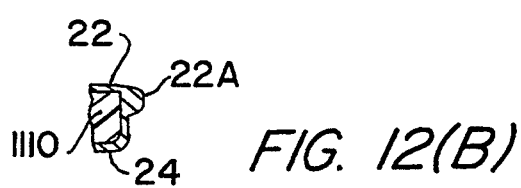
FIG. 12B is a sectional view similar to FIG. 12A and includes a material disposed in the cavity thereof.

Further, as illustrated in FIGS. 11B and 12B, soft foamed polyurethane resin 110 is filled in an inner chamber at the rear half portion of each of the main body frames 18L and 18R. More particularly, into an inner chamber extending from the partition wall 36 to a location adjacent the opening 72. After the main body frames 18L and 18R which are cast articles have been assembled into a unitary member together with other frame elements by welding, the foamed polyurethane resin 110 is obtained by pouring resin liquid through the plurality of openings 42 into the inner chambers of the main body frames 18L and 18R so that it may foam in the inner chambers. If a fitting coupling of the first horizontally extending frame pipe 88, the second horizontally extending frame pipe 90 and third horizontally extending frame pipe 92 are mounted to the openings 38 and 40 and the holes 50 of the main body frames 18L and 18R is made not by welding but by joining by means of a bonding agent, raw resin material liquid should be poured into the inner chambers of the main body frames 18L and 18R through the plurality of openings 42 and the openings 38 and 40 and holes 50 before the body frame 12 is assembled.

Referring to FIGS. 25–29, a motorcycle frame 1A includes a head pipe portion 2A at a front portion and a body frame portion 3A extending downwardly and rearwardly in an inverted U-shape from the head pipe portion 2A. The frame 1A is formed by casting into two left and right divided blocks along a dividing plane 4A on a center line X of a motorcycle body.

The motorcycle frame 1A is formed from a light alloy and divided leftwardly and rightwardly into two blocks including a left frame 5A and a right frame 6A. The dividing plane 4A of the motorcycle body frame 1A is provided, at the front portion 11a, so as to extend in an L-shape obliquely forwardly from the center line X of the motorcycle body at a location rearwardly of the head pipe portion 2A and bypassing the head pipe portion 2A.

At an intermediate portion 11b, the dividing plane 4A is provided on the center line X at the center of a first cross member 7A, and at a rear portion 11c. The dividing plane 4A is provided on the center line X at the center of a second cross member 8A. The left frame 5A and the right frame 6A are welded to each other along the dividing plane 4A to assemble the motorcycle body frame 1A as a unitary member.

Each of the two left and right frames 5A and 6A includes a plurality of engine mounts 9A serving as stays for an engine formed on an lower side thereof. In addition, a pair of mounting bosses 10A and 10A are provided for a seat frame formed on an upper side thereof. Further, a pair of stand mounting holes 11A and 11A are formed in the second cross member 8A on the lower sides of the two left and right frames 5A and 6A. The left frame 5A includes an opening 12A for a wire or a harness formed on the left side of the head pipe portion 2A thereof while the right frame 6A is constructed as a solid member at a portion of the first cross member 7A. A mounting member hole 13A for a shock absorber that constitutes a rear suspension is formed in the solid portion of the right frame 6A.

Figure 29:
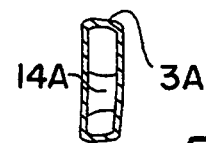
FIG. 29 is a sectional view taken along line V—V of FIG. 25.

The body frame portion 3A is formed as a hollow member and the sectional shape thereof is such that a plurality of ribs 14A may be present in the inside of the hollow section, as shown in FIG. 29, for preventing the production of noise. The configuration of the ribs 14A is formed into a substantially trapezoidal shape wherein the inner side of the body frame portion 3A is the bottom side so that a so-called sink mark upon the casting may appear on the inner side of the frame body and the outer side may be formed into a smooth finish.

Figure 30:
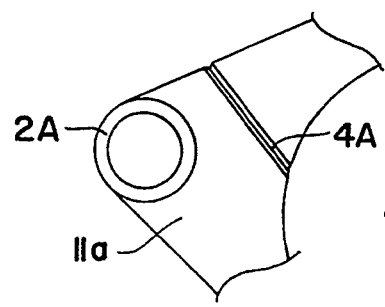
FIG. 30 is a modification to a dividing plane at the front protion of the motorcycle body frame.

It is to be noted that the dividing plane 4A at the front portion 11a of the motorcycle frame 1A may be constructed as an oblique linear line with respect to the center line X of the motorcycle body as shown in FIG. 30.

With the construction described so far, the motorcycle frame 1A can be assembled only when the two left and right frames 5A and 6A with the head pipe portion 2A, two cross members 7A and 8A, an engine mount 9A and so on are formed in an integral relationship on the body frame portion 3A by casting and are then placed in an opposing relationship and welded to each other.

Further, by the incorporating into the left frame 5A the head pipe portion 2A, which is most acted upon by the stress from the direction of the length of the motorcycle, the working accuracy of the head pipe portion 2A can be readily attained. In addition, the dividing plane 4A at the front portion 11a of the motorcycle frame 1A is provided in an L-shape bypassing the head pipe portion 2A. It is possible to prevent a shearing force caused by the stress being applied along the dividing plane.

Subsequently, a seat frame 15A is connected to the intermediate upper side of the body frame 3A is shown in FIGS. 31 to 34. The seat frame 15A is connected at a front portion 115a by the mounting bosses 10A of the motorcycle frame 1A and extends rearwardly so that a seat may be supported at an upper portion thereof. The seat frame 15A is composed of a pair of body frame portions 16A and 16A on the opposite sides. A connecting portion 19A extends from an intermediate portion 115b to a rear portion 115c thereof and serves commonly as a cross member 17A for the seat frame 15A and a mud guard 18A. The connecting portion 19A is formed by casting into two leftwardly and rightwardly symmetrical members. Divided frames of a left frame 21A and a right frame 22 along a dividing plane 20A on a center line X of a motorcycle. The left frame 21A and the right frame 22A are welded to each other along the dividing lane 20A to assembly the seat frame 15A into a unitary member.

Figure 33:
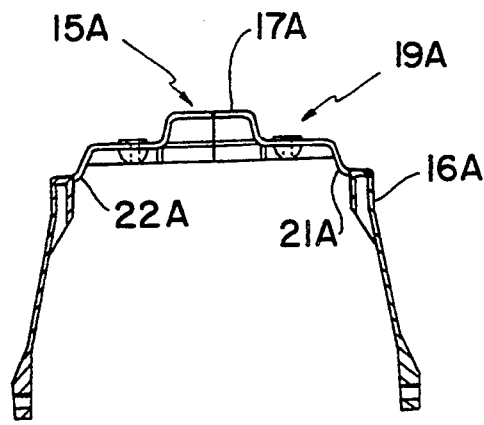
FIG. 33 is a sectional view taken along line XI—XI of FIG. 31.
Figure 34:
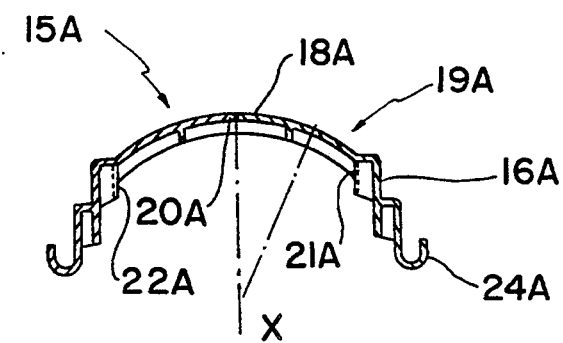
FIG. 34 a sectional view taken along line X—X of FIG. 31.

The body frame portions 16A are formed into ribs having an inverted U-shaped cross section as shown in FIGS. 33 and 34 so as to retain the strength thereof. Mounting portions 23A for step holders and grip portions 24A are formed on the lower sides of the body frame portions 16A. An upwardly projecting mud guard 18A for a rear wheel is formed at an intermediate portion of the connecting portion 19A.

It is to be noted that the seat frame 15A is made of a light alloy similarly to the body frame 1A.

With the construction described above, the seat frame 15 can be assembled, only when the two left and right frames 21A and 22A with the cross member 17A, the mud guard 18A, the mounting portions 23A for the step holder and so on are formed in an integral relationship on the body frame portion 16A by casting are placed in an opposing relationship and welded to each other similarly to the motorcycle frame described hereinabove.

Figure 35:
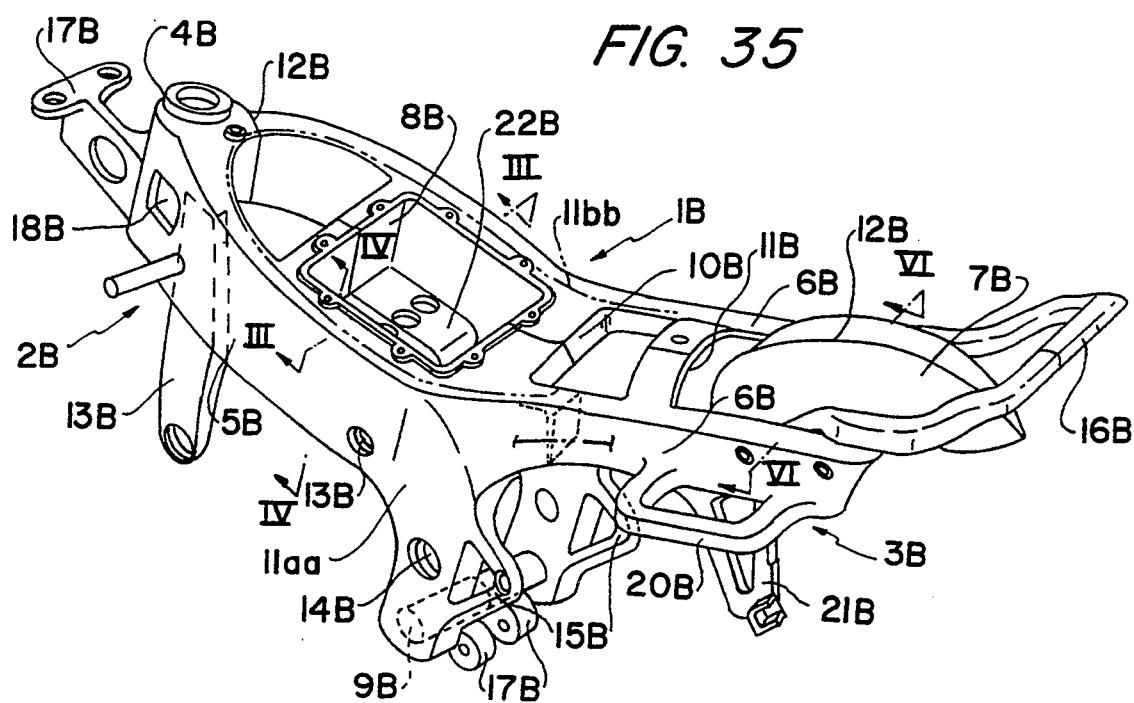
FIG. 35 is a perspective view showing another embodiment of the present invention.
Figure 36:
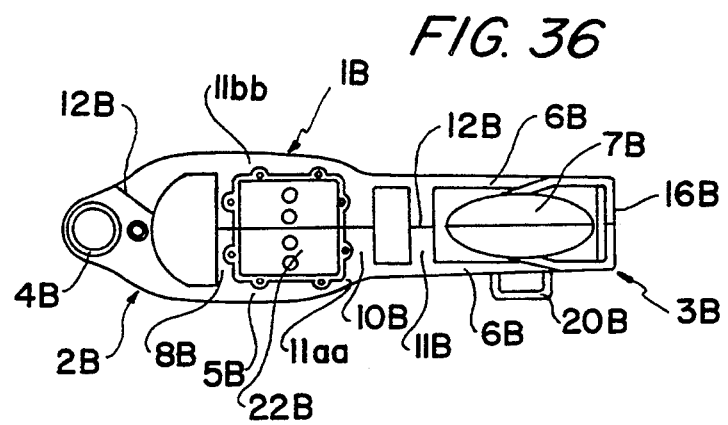
FIG. 36 is a reduced plan view of FIG. 35.

Referring to FIGS. 35 and 36, a motorcycle frame 1B is composed of a front frame 2B and a rear frame 3B. The two frames 2B and 3B are integrated with each other and formed into two left and right divided blocks by casting.

The front frame 2B has a head pipe portion 4B and a body frame portion 5B extending obliquely downwardly and rearwardly in an inverted U-shaped from the head pipe portion 4B. The rear frame 3B has a pair of left and right seat frame portions 6B and 6B extending obliquely upwardly and rearwardly from the upper opposite sides of an intermediate portion of the front frame 2B. A mud guard portion 7B is provided between rear portions of the seat frame portions 6B and 6B.

Further, a first cross member 8B and a second cross member 9B are formed at an intermediate portion and a rear portion, respectively, of the front frame 2B while a third cross member 10B and a fourth cross member 11B are formed at a base portion and an intermediate portion, respectively, of the rear frame 3B. At the center of frames, that is, on a center line X of the motorcycle body, a dividing plane 12 is provided by casting into two divided blocks.

The motorcycle frame 1B is formed from a light alloy and divided leftwardly and rightwardly into two blocks including a left frame 11aa and a right frame 11bb. The dividing plane 12B of the motorcycle frame 1B is provided, at the front portion, so as to extend obliquely with respect to the center line X of the motorcycle body at a location obliquely rearwardly of the head pipe portion 2B bypassing the head pipe portion 2B so that no shearing force in the direction along the length of the car body may be applied along the dividing plane. The dividing plane 12B is provided at the center of the cross members 8B, 9B, 10B and 11B, the mud guard 7B and so on, that is, on the center line X of the motorcycle body. The left frame 11aa and the right frame 11bb are welded to each other along the dividing plane 12B to assemble the motorcycle frame 1B as a unitary member.

Figure 37:
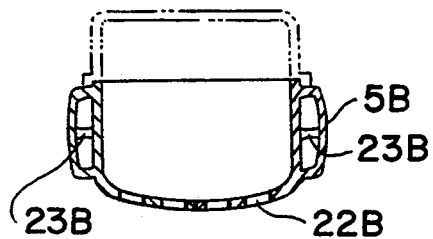
FIG. 37 is a sectional view taken along line III—III of FIG. 35.

The left and right frames 11aa and 11bb have a plurality of engine mounts 13B serving as stays for an engine. A pivot mounting hole 14B is provided for a rear fork and mounting bosses 15B and 15B for a main step. A carrier 16 and stand mounting holes 17B and 17B are formed individually in an integral relationship on a lower side of a front portion, an intermediate lower portion, a rear end and the second cross member 9B thereof, respectively. Further, the left frame 11aa has a mounting portion 17B for a head light or the like. An opening 18B is provided for a wire or a harness. A grip portion 20B and a step holder 21B are formed in an integral relationship at a front end of the head pipe portion 2B, on the left side and at a rear portion thereof, respectively. Further, as shown in FIG. 37, a bottom plate 22B is formed in an integral relationship between the first cross member 8B and the third cross member 10B. A fuel tank is disposed in an internal space between the cross members. In the alternative, the internal space may be utilized as a containing box.

Figure 38:
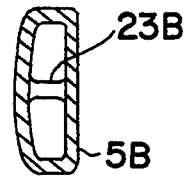
FIG. 38 is a sectional view taken along line IV—IV of FIG. 35.
Figure 39A:
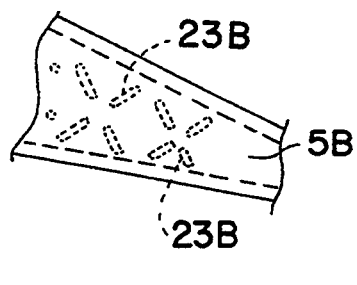
FIG. 39 is a partial enlarged view of a body frame.
Figure 39B:
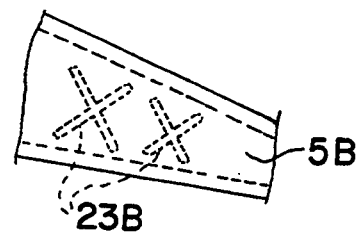

The motorcycle frame portion 5B is formed into a hollow as shown in FIG. 38, and the sectional shape thereof is such that a plurality of ribs 23B may be present in the inside of the hollow so as to provide for assurance of strength and prevention of production of noise. The ribs 23B are provided radially or in an X-shape as shown in FIGS. 39(A) and 39(B).

Figure 40:
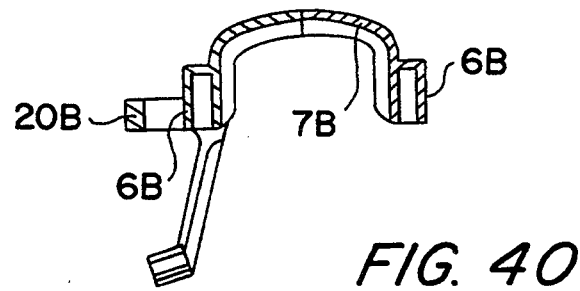
FIG. 40 a sectional view taken along line VI—VI of FIG. 35.

The seat frame portions 6B and 6B are formed in an inverted U-shape in section as shown in FIG. 40, and at inner ends of the same. The mud guard portion 7B is formed in a contiguous relationship from the seat frames 6B and 6B.

With the construction described so far, the body frame 1B can be assembled only when the head pipe portion 4B, seat frame portions 6B and 6B, cross members 8B, 9B, 10B and 11B, mud guard portion 7B, engine mount 13B, etc. are formed in an integral relationship on the body frame portion 5B and into two divided blocks by casting and the two left and right frames 11aa and 11bb are placed in an opposing relationship and welded to each other.

And, since the components can be formed into such shapes that may conform to the strengths of the individual portions and have no waste, gussets and so on at the individual portions become unnecessary. The entire motorcycle frame 1B can be constructed with a comparatively small weight.

Figure 41:
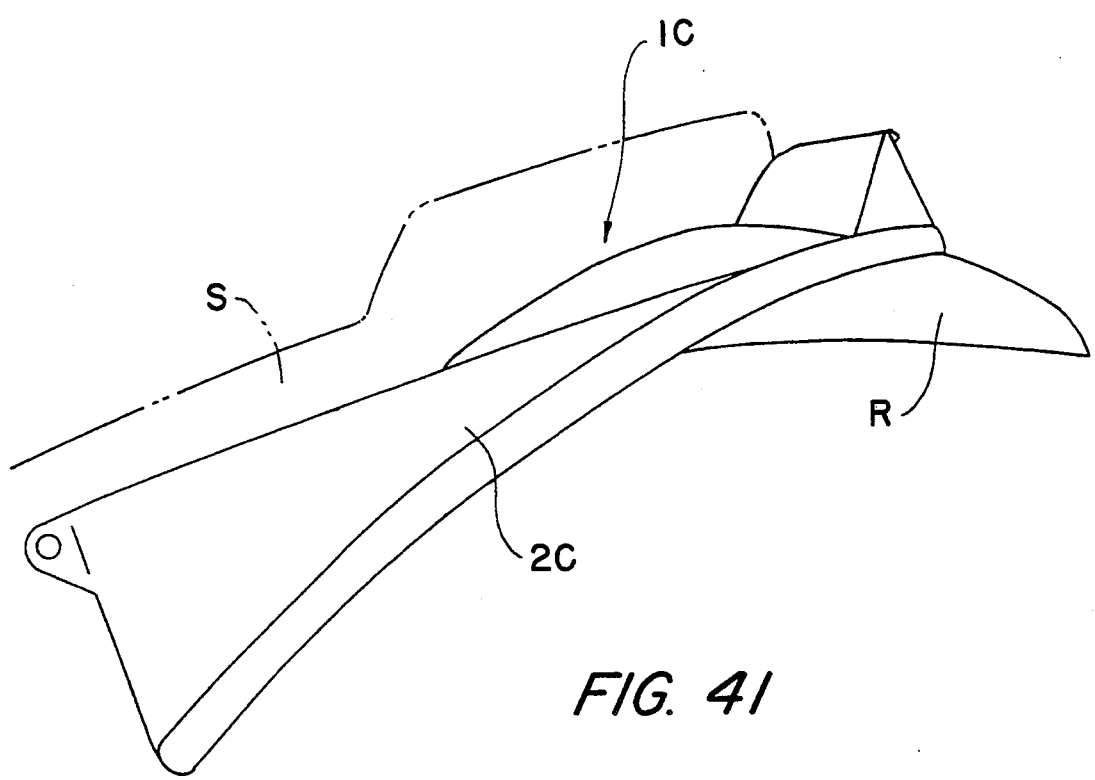
FIG. 41 is a perspective view of a unitary seat construction.

In the embodiment illustrated in FIG. 41, a seat frame 1C is not formed by casting into two frames of the left frame and the right frame. The entire seat frame is formed into a unitary member by casting. The seat frame 1C is composed of body frame portions consisting of seat rails and back stays, and a connecting portion consisting of a cross member and a mud guard for a rear wheel. In addition, mounting bosses for various parts are integrated with the seat frame 1C, and a mud guard portion which is located below a rear seat is formed by casting such that it may be formed upwardly within the seat frame 1C.

Characteristic points of the present embodiment are as follows:

(1) The load of the motorcycle body and the weight of a rider is supported and acts upon the body frame 12 at the head pipe 16 on which the rotary shaft for the handle is supported, and portions of the pair of left and right main body frame pipes 18 adjacent the openings 52 near the rear ends. In addition, the load is supported and acts upon portions adjacent the openings 38 of the pair of left and right main body frame pipes 18 on which the first horizontally extending frame pipe 88 to which the upper end of the rear shock absorber 104 is connected. Since the load acting upon the body frame 12 is heavier at the location of the head pipe 16 which is a single point and lighter at the rear end portions, or lower end portions, of the main body frame pipes 18L and 18R which are separated leftwardly and rightwardly, the widths of the inner and outer side walls 22 and 24 of the main body frame pipes 18 increase from the rear end portions toward the front end portions. Therefore, the modulus of the section of the front end portions is greater than the modulus of the section of the rear end portions. However, the projecting members 60 on which the weight of a rider acts, the openings 28 on which the first horizontally extending frame pipe 88, to which the rear shock absorber 104 is connected, and the projecting members 68 for supporting the engine E are provided at intermediate portions of the main body frame pipes 18 in the longitudinal direction and high strength and rigidity are required at these locations. Thus, the widths of the inner and outer side walls 22 and 24 increase from the rear end portions toward the locations and then decrease once until they connect to the head pipe. The narrower portions, however, are reinforced and stiffened by the engine E. In particular, the engine E is coupled to the body frame 12 at the points C which are the lower end portions of the engine supporting pipes 74, the points D of the projected pieces 68, and the points F which are the rear end portions of the main body frame pipes 18. Thus, points C, D and F share the load which acts upon the body frame 12.

In this manner, selection of an optimum configuration of the body frame 12 which takes a load application into consideration enables reduction in weight and is easy because the body frame 12 is formed by a casting method. It is to be noted that the optimum configuration here includes a configuration of the body frame 12 as a pipe frame which has various projecting members, ribs, openings, engine supporting pipes 74, etc.

(2) The hollow sectional area of the main frame pipes 18 is increased at the connecting portions to the head pipe 16, the connecting portions to the engine supporting pipes 74, the portions adjacent the openings 38 to which the first horizontally extending frame pipe 88 is connected, the portions to which the projected pieces 68 are applied, and the portions adjacent the opening 52. Therefore, the load acting upon the main frame pipes 18 is dispersed at those locations. Thus, a body frame of a light weight and a high rigidity can be obtained as a whole.

(3) Since the main body frame pipes 18 are pipe members, they have a great modulus of section as compared with a solid member having the same cross-sectional area. In other words, the main body frame pipes 18 are light in weight compared with a solid member of the same modulus of section.

(4) While the upper and lower walls 20 and 26 of the main body frame pipes 18 are sufficiently narrow in width compared with the inner and outer side walls 22 and 24, the thickness of the material of the former is made greater than the latter in order to withstand a bending force in the widthwise direction of the motorcycle, for example, the thickness of material of the upper and lower walls 20 and 26=4 mm, and the thickness of material of the inner and outer side walls 22 and 24=3 mm.

(5) The head pipe 16 and the main frame pipes 18 are connected to each other by way of a wall body which is curved moderately. The wall member has a smooth surface so that a high rigidity can be assured. In addition, with this configuration, the molten bath flows upon casting, smoothly into the cavity of the casting mold so that it will only involve air bubbles a little. Accordingly, a superior cast quality is assured and the productivity is high.

(6) The outer side walls 22 of the main body frame pipes 18 are curved and swollen moderately outwardly so that the flexural rigidity in the widthwise direction of the car is increased.

(7) The inner side walls 22 of the main body frame pipes 18 are formed as straight wall bodies, and a large member disposing space can be assured between the left and right main body frame pipes 18L and 18R because the widths of the upper and lower walls 20 and 26 are small.

(8) A portion of the head pipe 16 for receiving a heavy load has a layered structure which is composed of a wall of the head pipe 16 itself, the outer side walls 24 of the main body frame pipes 18 and the front end portions 22a of the inner side walls 22, as illustrated in FIGS. 2 and 5, and has a high rigidity.

(9) The projecting members 28R and 28L are provided to project on the front wall 16a of the head pipe 16 and are displaced in the upward and downward directions. Accordingly, they can effectively stand against a torsional force action around the center line upon an arm member on the fairing side which is supported at the two points of the projecting members 28R and 28L.

(10) The ribs 34 are provided and project on the outer side walls 24 of the main body frame pipes 18 and the partition walls 36 interconnect the inner and outer side walls 22 and 24 for stiffening the outer side walls 24 and prevent production of vibration noises. Further, particularly because each of the partition walls 36 partitions the inside of a corresponding one of the main frame pipes 18 into a plurality of chambers, production of resonance sounds is restricted.

(11) The ribs 34 and partition walls 36 which prevent production of noise of the main frame pipes can be formed in an integral relationship with bodies of the main frame pipes 18 by casting. This construction is economical compared with an alternative arrangement wherein the ribs and walls are affixed to the main frame pipes by welding.

(12) The ribs 44 on the inner side walls 22 at portions around the openings 38 are directed in the direction of the axial line of the rear shock absorber 104 and stiffen the inner side walls 22 against a load acting upon the inner side walls 22 due to a coupling relationship to the first horizontally extending frame pipe 88 on which the rear shock absorber 104 is supported.

(13) The ribs 54 on the inner side walls 22 at portions around the openings 52 stiffen the inner side walls 22 against a load acting upon the inner side walls 22 due to an engaging relationship with the support shaft 102 on which the rear fork 98 is supported.

(14) While the distance between the main body frame pipes 18L and 18R is made greater at the front half portion than at the rear half portion in accordance with the lateral widths of the straight 4-cylinder engine E, the projecting members 60 for supporting the rear body frame 94 thereon are located at the curved portions for the same, and in order to stand against a load acting upon the curved portions in the widthwise direction of the motorcycle, the width of the upper walls 20 is increased locally and the upper portions 22B of the inner side walls 22 are shaped such that they may be swollen toward the side of the center of the body in the widthwise direction of the motorcycle. Thus, improvement in the rigidity of the main body frame pipes 18 is obtained.

(15) While the flanges 48 are formed as upper limit vibration preventing members for a driving chain 106 for the rear wheel RW, they stiffen the main body frame pipes 18 together with the flange-like extensions 22A of the inner side walls 22.

(16) While a core is used for casting the hollow portions of the main body frame pipes 18 and the engine supporting pipes 74, the openings 42 and 80 formed by core prints for the core are formed in the inner side walls 22 of the main body frame pipes 18 and the inner side walls 78 of the engine supporting pipes 74, the appearance of the main body frame pipes 18 is not deteriorated.

(17) The dividing plane of the metal mold 110 is positioned on the inner sides of the upper and lower walls 20 and 26, the sides along the inner side walls 22 in the widthwise direction of the motorcycle. Thus, the main body frame pipes 28 have a good appearance.

(18) The outer side walls 24 of the main frame pipes 18 and the outer side walls 82 of the engine supporting pipes 74 connect to each other smoothly at outer side faces thereof. Thus, an excellent appearance is provided with a large area that is obtained because the outer side walls 24 have a great width.

(19) The cores for forming the hollow portions of the main body frame pipes 18 and the engine supporting pipes 74 are each formed as three divided bodies, one from the partition wall 36 to the head pipe 16, a second from the partition wall 36 to a location above the opening 72, and a third from being an inner chamber portion of the engine supporting pipe 74. Dimension management of the cores and proper setting of the cores into the metal molds are easy. Predetermined correct thicknesses of material of the main body frame pipes 18 and the engine supporting pipes 74 can be obtained.

(20) The outer side walls 24 of the main body frame pipes 18 and the outer side walls 82 of the engine supporting pipes 74 connect to each other smoothly at outer side faces thereof. An excellent appearance having a large area can be obtained because the outer side walls 24 have a great width.

(21) The points D, locations adjacent the openings 70, and points F, locations adjacent the openings 72, are supporting points for the engine E and are positioned at the rear half portions of the main body frames 18L and 18R. The inner chambers of these members are filled with the foamed polyurethane resin 110. If vibrations of the engine E in an operating condition are transmitted to the main body frames 18L and 18R from the projected pieces 68 and the locations adjacent the openings 72, the vibrations are damped due to internal friction of the foamed polyurethane resin 110. The polyurethane resin closely contacts with the upper walls 20, the inner side walls 22, the outer side walls 24 and the lower walls 26. Thus, because vibration noises of the main body frames 18L and 18R are absorbed by the foamed polyurethane resin 110 which is a porous substance, production of resonance sounds at the main body frames 18L and 18R is prevented. If foamed polyurethane resin is filled in the inner chambers of the engine supporting pipes 74, production of vibration noises of the body frame 12 can be prevented more effectively. Filling of foamed polyurethane resin into the inner chambers of the engine supporting pipes 74 is independent of the inner chambers of the main body frames 18L and 18R and may be conducted through the openings 80. In addition, if foamed polyurethane resin is filled also in the chambers at the front half portions of the main body frames 18L and 18R, the chambers forwardly of the partition walls 36, a higher vibration noise reducing effect can be anticipated. It is to be noted that, in the present embodiment, taking economy into consideration, the foamed polyurethane resin 110 is filled only in the chambers at the rear half portions of the main body frames 18L and 18R.

(22) The partition walls 36 function to prevent vibration noises produced in the inner chambers at the rear half portions of the main body frames 18L and 18R from propagating to the inner chambers at the front half portions of the main body frames 18L and 18R. Compared with an alternative arrangement wherein no partition wall 36 is present, the partition walls 36 prevent production of resonance sounds of a relatively low frequency. Further, the partition walls 36 have a further function to stiffen the circumferential walls of the main body frames 18L and 18R together with the ribs 34 to restrict vibrations of the circumferential walls. In this regard, the production of vibration noise of the main body frames 18L and 18R is small.

(23) The main body frames 18L and 18R are cast hollow frames that include the plurality of openings 42 and 80 which originate from core prints for supporting thereon cores for forming the inner chambers of the main body frames 18L and 18R. Raw foaming resin liquid can be poured into the frame inner chambers through the openings 42 and 80. Accordingly, there is no need of separately forming openings by machining for pouring raw foaming resin liquid therethrough. Thus, an increase in production cost of a body frame can be restricted. Further, the openings 42 and 80 originating from core prints and also the inner windows 32 and the openings 38 and 40 are convenient and can be utilized as openings for pouring raw material foaming resin liquid therethrough.

(24) If foamed polyurethane resin is filled in all of the inner chambers of the main body frame 18L and 18R to restrain vibrations of the body frame 12, foamed bodies for damping which are conventionally mounted on a cowling, front body cover, that are supported on the machine frame 12 can be omitted. An improvement in appearance can be anticipated.

(25) The foamed polyurethane resin 110 is light in weight, and the characteristic of the body frame 12 as a hollow frame which is light in weight is not deteriorated.

EFFECTS OF THE INVENTION

As is apparent from the foregoing description, a body frame for a motorcycle is constructed of the type formed from the principal components of a head pipe for supporting a rotary shaft for a handle, a pair of left and right main body frame elements connected to the head pipe and extending rearwardly of a motorcycle body, a pair of left and right engine supporting members connected to and extending downwardly from the main body frame elements near the head pipe, and a horizontally extending frame element for connecting the left and right main body frame elements to each other at intermediate portions in the longitudinal direction. An engine is supported at least at lower end portions of the left and right engine supporting members and intermediate portions in the longitudinal direction of the left and right main body frame elements. An upper end portion of a rear shock absorber is connected to the horizontally extending frame-element. The body frame is formed as a cast article made of a light alloy and assembled by joining together by welding two leftwardly and rightwardly divided blocks of such shapes that are vertically divided at a head pipe portion to each other. The main body frame elements are each formed as a pipe having a rectangular cross section wherein the widths of the opposite side walls are great as compared with the widths of upper and lower walls. Further, the widths of the side walls vary from a front end portion connected to the head pipe to a rear end portion such that they may be smaller between the rear end portion to an intermediate portion and may gradually increase from the rear end portion to the intermediate portion.

Since the frame body is formed by casting, the various projecting members, ribs, etc. can be cast in an integral relationship on the frame body, the labor for joining the various projecting members, ribs, etc. by welding after such casting can be eliminated. Thus, a reduction in the number of parts and an improvement in productivity can be anticipated.

Further, when a pipe frame is formed using pipe materials that are formed by normal plastic working, because the sectional area of the pipe materials is fixed, an operation to provide a reinforcing member to a location near a point upon which a heavy load acts or a like operation is required. However, were a casting method is employed, there is no need of such operation, and with the body frame of the present invention as a pipe frame, making use of the advantage that it is a cast article, the widths of the side walls of the left and right body frames are increased at points upon which a heavy load acts. For example, the front end portions connected to the head pipe, and the intermediate portions at which the engine is supported and the horizontally extending frame pipe to which the upper end of the rear cushion is connected is supported. The portions between the intermediate portions and the front end portions are reinforced and stiffened by the engine. Accordingly, the configuration wherein the widths of the vertical walls are decreased between the intermediate portions and the front end portions, that is, an optimum configuration wherein so-called acting loads are taken into consideration, is selected. Also, because the pipe frames that have a large modulus of section compared with a solid member having a same sectional area are adopted, sufficient reduction in weight and sufficient saving of material can be anticipated while assuring the strength and rigidity of the body frame.

As is apparent from the foregoing description, according to the embodiment of the present invention as illustrated in FIGS. 19-24, the following actions and effects can be achieved.

When the frame body is formed by casting, even particular structures such as various projecting members and ribs can be cast in an integral relationship on the frame body. The labor for joining the particular structures such as various projecting members and ribs by welding after such casting can be eliminated. Thus, a reduction in the number of parts and improvement in productivity can be anticipated. Further, with the configuration wherein the hollow sectional area of the main frame pipe is greater at the location at which the heavy load from the wheel is received and is smaller at the other portions, the load is effectively dispersed from the load applying point. As a whole, a body frame of a light weight and a high rigidity can be obtained.

In addition to the above, due to the configuration of the moderately curved wall body, molten bath flows upon casting, smoothly into the cavity so that no air bubbles will be involved. Accordingly, a superior cast quality is assured, and the productivity is high.

The rib or partition wall can be provided by casting without mounting a separate reinforcing member. Consequently, the rigidity of the peripheral wall is improved, and with the peripheral wall of such a high rigidity, resonance by vibrations of an engine will not readily take place, and production of noises is restricted. Particularly where the partition wall is provided, Production of noises by resonance can be effectively prevented.

When the pipe frame is formed by using pipe materials which are formed by normal plastic working, the sectional area of the pipe materials is fixed. An operation to provide a reinforcing member at a location near a point upon which a heavy load acts or a like operation is then required. However, when a casting method is employed, there is no need for such an operation. The body frame of the present invention is a pipe frame, by making the hollow sectional area greater at the heavy load applying point and making the hollow sectional area smaller at the other portions than at the heavy load applying point, sufficient reduction in weight and sufficient savings of material can be anticipated while assuring the strength and rigidity of the body frame. This result is also achieved, due to the fact that the pipe frame that has a large modulus of section as compared with a solid member having a same sectional area is used.

The speed of the molten bath passing the dams is sufficiently high, maximum at the lowermost dam, and filling of the molten bath into the cavity is effected rapidly from the lower portion to the upper portion of the cavity while solidification of the molten bath from the lower end portion also proceeds upwardly. Accordingly, a smooth rise of the dissolved gas caused by solidification of the molten bath is assured. Further, disturbance of the molten bath is reduced because the molten bath rises from the lowermost portion of the cavity and springs up gently. Accordingly, the exhaust paths will not be closed at an initial stage of pouring of the bath and at least one of the exhaust paths that is located at the uppermost position will remain in communication until after a point in time of completion of the casting. Accordingly, filing of the molten bath into the cavity can be effected with certainty. With the present casting mold structure, even a good, long, thin hollow member can be readily produced.

When the acoustic material or the damping material is filled within the hollow body frame, vibrations which propagate from an engine or the like which is a vibration generating source to the hollow frame are damped by the damping material. In addition, vibration noise produced in the hollow body frame is absorbed by the acoustic material. Further, the production of noise is reduced in the entire body frame.

The partition wall for partitioning the inside of the hollow body frame into a plurality of chambers prevents production of resonance sounds in a relatively low frequency region and propagation of noise. Thus, the production of noise is reduced in the entire body frame.

Due to the presence of the partition wall, production of resonance sounds in a relatively low frequency region and propagation of noise can be prevented. The production of noise is restrained by the acoustic material or the damping material. Thus, production of noise is reduced in the entire body frame.

By casting the head pipe portion and the body frame portion in an integral relationship, the number of parts can be reduced and coupling operations can be reduced. Thus, the number of man-hours needed for assembly is reduced which results in a reduction in cost. Further, by incorporating the head pipe portion into one of the divided frames which are cast in an integral relationship, improvement in working accuracy of the head pipe portion and the strength of the front portion of the car body frame can be improved.

Further, by casting the head pipe portion and the body frame portion in an integral relationship even including the cross member, the reduction in the number of parts and in the cost can be further reduced. In addition, by casting the head pipe portion and the body frame portion in an integral relationship even including the mud guard, several stays etc. on the seat frame, the result is a reduction in the number of parts around the seat frame and a reduction in the cost.

The body frame and the seat frame, cross member, mud guard, several stays, etc. are provided directly on the body frame and are integrated with one another and formed by casting. The number of parts can be reduced and portions of the frame to be worked and portions to be welded can be reduced to reduce the number of man-hours for assembly. Thus, the present invention attains a reduction in cost. Further, since the entire frame can be formed in accordance with the strengths required for the individual portions, reduction in weight can be anticipated comparing with a conventional frame.

The seat frame may be formed to include seat rails and back stays, a cross member, mounting bosses for various parts, etc. in an integral relationship. The number of parts is reduced and working operations for various portions of the frame are reduced to the utmost to reduce the number of man-hours for assembly. Consequently, reduction in cost can be attained. Formation by casting can be made easy and reduction in cost can be attained. Further, the foot placement of an individual may be improved. In addition, the front portion of the mud guard can be formed at the same time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A body frame for a motorcycle including a head pipe for supporting a rotary shaft for a handlebar comprising:
   a main body frame element connected to said head pipe and extending rearwardly of a motorcycle body; and
   a first engine supporting member connected to and extending downwardly from said main body frame element adjacent to said head pipe, an engine being supported at least at a lower end portion of said engine supporting member and at a portion of said main body frame element in the longitudinal direction thereof;
   said main body frame element having a hollow sectional area with an increased sectional area adjacent to:
      a first connecting portion adjacent to said first head pipe corresponding to a location where a load from a wheel is transmitted to said main body frame element and adjacent to the first engine supporting member, and
      second engine supporting portions corresponding to a location where an engine is connected,
   said hollow sectional area of said main body frame element is decreased in sectional area relative to the increased sectional area adjacent to said first connection portion and second engine supporting portions at intermediate portions of said main body frame element disposed between the first connecting portion and second engine supporting portions,
   said first engine supporting member extending rearwardly at a predetermined acute angle relative to the longitudinal axis of said head pipe, and said main body frame including inner and outer side walls each having a height which gradually varies from said head pipe to said second engine supporting portions for forming a reduced inner and outer side wall height between the first connecting portion and said second connecting portion, and
   a second connecting portion of said main body frame element adjacent at one side to the first connecting portion and on another side to said decreased sectional area and adjacent to said first engine supporting member, the second connecting portion having an increased hollow sectional area relative to the decreased sectional area.

2. A body frame for a motorcycle including a head pipe portion and a body frame portion extending rearwardly from said head pipe portion comprising:
   divided frames forming said body frame portion, said divided frames being substantially symmetrical and including left and right frame members being formed independent of each other;
   said head pipe portion is in an integral relationship in contact with only one of said divided frames and said divided frames are coupled together to form a unitary member.

3. A body frame for a motorcycle including a head pipe portion and a body frame portion extending downwardly and rearwardly in an inverted U-shape from said head pipe, said body frame portion including left and right frame members coupled to each other comprising:

said head pipe portion being in contact with only one of said left and right frame members;

a cross member formed in an integral relationship with said body frame portion;

a plurality of stays provided on said body frame; and a dividing plane formed at a front portion of said body frame and bypassing said head pipe portion, the dividing plane being located between the left and right frame members;

said left and right frames being coupled together to form a unitary member.

4. The body frame according to claim 2, and further including a cross member for connecting said divided frames to each other, said cross member being positioned in an integral relationship on at least one of said divided frames.

5. The body frame according to claim 2, and further including a seat frame extending rearwardly from an intermediate upper portion of said body frame portion, a cross member operatively connected to said seat frame, a plurality of stays provided on said seat frame and a mud guard for a rear wheel formed integrally relative to each other, said left and right frame members being divided in a plane along the direction of the length of the body frame and coupled together to form a unitary member.

6. The body frame according to claim 5, and further including a seat frame extending rearwardly from an intermediate upper portion of said body frame and a mud guard for a rear wheel including left and right divided blocks along a dividing plane on a center line of said body frame and said two divided blocks being coupled together to form a unitary member.

7. The body frame according to claim 5, wherein said body frame extends obliquely downwardly and rearwardly in an inverted U-shape from said head pipe and said seat frame extends obliquely upwardly and rearwardly from an intermediate upper portion of said body frame.

8. A seat frame for a motorcycle including a front end connected to and extending rearwardly from an intermediate upper portion of a main frame of a motorcycle comprising:

a seat rail disposed on an upper portion of said seat frame;

back stays disposed on said upper portion of said seat frame and positioned adjacent a rear portion thereof;

a cross member secured to said seat rail;

mounting bosses being provided on said seat rail for securing elements thereto;

a mud guard being disposed on an underside of said seat frame for mounting adjacent to a rear wheel of said motorcycle;

said seat rail, back stays, cross member, mounting bosses and mud guard forming a seat frame member, two substantially symmetrical seat frame members being coupled together to form a unitary member.

9. The seat frame according to claim 8, wherein said mud guard forms an upwardly projecting portion in said seat frame.

10. The seat frame according to claim 9, and further including downwardly directed ribs crossing said seat frame and formed in an integral relationship forwardly of said mud guard.

11. A body frame for a motorcycle including a head pipe portion for supporting a rotary shaft for a handlebar comprising:

a main body frame element connected to said head pipe and extending rearwardly of a motorcycle body;

a first engine supporting member connected to and extending downwardly from said main body frame element adjacent to said head pipe, wherein an engine is capable of being supported at least at a lower end portion of said first engine supporting member and at a portion of said main body frame element in the longitudinal direction;

said first engine supporting member being affixed directly to said head pipe portion corresponding to a location where a load from a wheel is transmitted to said main body frame element and extending rearwardly in the direction of said main body frame and projecting downwardly therefrom at an acute angle relative to the longitudinal axis of said head pipe;

said main body frame element having a hollow sectional area with an increased sectional area adjacent to said first engine supporting member affixed to said head pipe portion and a second engine supporting portion, said hollow sectional area of said main body frame element is decreased in sectional area relative to the increased dimension adjacent to said first engine supporting member affixed to said head pipe portion and said second engine supporting portion at intermediate portions of said main body frame element disposed between the first engine supporting member and the second engine supporting portion and said main body frame including inner and outer side walls each having a height which gradually varies from said head pipe to said second engine supporting portion for forming a reduced inner and outer side wall height between the first engine supporting member to said second engine supporting member.

* * * * *